(12) United States Patent
Dutta

(10) Patent No.: US 12,261,769 B2
(45) Date of Patent: Mar. 25, 2025

(54) SOURCE ROUTE COMPRESSION

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 29 days.

(21) Appl. No.: 17/380,828

(22) Filed: Jul. 20, 2021

(65) Prior Publication Data

US 2023/0028147 A1    Jan. 26, 2023

(51) Int. Cl.
*H04L 45/00* (2022.01)
*H04L 45/02* (2022.01)
*H04L 45/74* (2022.01)

(52) U.S. Cl.
CPC .................... *H04L 45/34* (2013.01)

(58) Field of Classification Search
CPC ......... H04L 45/00; H04L 45/34; H04L 45/04; H04L 45/74
See application file for complete search history.

(56) References Cited

U.S. PATENT DOCUMENTS

| | | | | |
|---|---|---|---|---|
| 10,917,334 | B1 * | 2/2021 | Lamanna | H04L 45/50 |
| 11,356,409 | B1 * | 6/2022 | Ng | G06F 9/50 |
| 2005/0063352 | A1 * | 3/2005 | Amara | H04L 63/20 |
| | | | | 370/338 |
| 2010/0027539 | A1 * | 2/2010 | Beverly | H04L 45/00 |
| | | | | 370/389 |

(Continued)

FOREIGN PATENT DOCUMENTS

| | | |
|---|---|---|
| CN | 112491708 A | 3/2021 |
| CN | 113014485 A | 6/2021 |
| WO | 2019011201 A1 | 1/2019 |
| WO | 2019239172 A1 | 12/2019 |

OTHER PUBLICATIONS

RFC 8200, Internet Protocol, Version 6 (IPv6) Specification, Jul. 2017 (Year: 2017).*

(Continued)

*Primary Examiner* — Harry H Kim
(74) *Attorney, Agent, or Firm* — Tong, Rea, Bentley & Kim, LLC

(57) ABSTRACT

Various example embodiments for supporting source routing are presented herein. Various example embodiments for supporting source routing may be configured to support source route compression for source routing. Various example for supporting source route compression for source routing may be configured to support communication of a source routed packet over a path from an ingress node to an egress node over a network, wherein the network includes a set of network elements having a respective set of network element identifiers sharing a common prefix, wherein the source routed packet has encoded therein a source route block including the common prefix and an offset list, wherein the offset list includes a set of offset values associated with respective ones of the network elements of the path and configured to be combined with the common prefix to recover the network element identifiers of the respective ones of the network elements of the path.

11 Claims, 17 Drawing Sheets

(56) References Cited

U.S. PATENT DOCUMENTS

| | | | |
|---|---|---|---|
| 2015/0256456 A1* | 9/2015 | Previdi | H04L 45/745 370/392 |
| 2016/0020988 A1* | 1/2016 | Hui | H04W 84/18 370/254 |
| 2016/0380887 A1* | 12/2016 | Black | H04L 45/34 370/392 |
| 2017/0149685 A1* | 5/2017 | Wu | H04L 12/4633 |
| 2019/0020737 A1* | 1/2019 | Han | H04L 69/167 |
| 2020/0287824 A1 | 9/2020 | Dutta | |
| 2020/0351388 A1* | 11/2020 | Han | H04L 69/325 |
| 2021/0211140 A1* | 7/2021 | Li | H03M 7/4056 |
| 2021/0306257 A1 | 9/2021 | Dutta | |
| 2021/0306265 A1* | 9/2021 | K A | H04L 45/507 |
| 2023/0122099 A1* | 4/2023 | Hu | H04L 45/00 370/392 |
| 2023/0188463 A1* | 6/2023 | Cheng | H04L 45/748 709/238 |

OTHER PUBLICATIONS

RFC 6554, An IPV6 Routing Header for Source Routes with the Routing Protocol for Low-Power and Lossy Networks (RPL), Mar. 2012 (Year: 2012).*

Filsfils, C., et al., "Segment Routing Architecture," IETF, RFC 8402, Jul. 2018, 32 pages.

Filsfils, C., et al., "Segment Routing Policy Architecture," IETF, IETF Draft, draft-ietf-spring-segment-routing-policy-09, Nov. 1, 2020, 37 pages.

Bashandy, A., et al., "Segment Routing with the MPLS Data Plane," IETF, RFC 8660, Dec. 2019, 29 pages.

Filsfils, C., et al., "IPV6 Segment Routing Header (SRH)," IETF, RFC 8754, Mar. 2020, 27 pages.

Awduche, D., et al., "RSVP-TE: Extensions to RSVP for LSP Tunnels," IETF, RFC 3209, Dec. 2001, 61 pages.

IETF, "Internet Protocol—DARPA Internet Program—Protocol Specification," IETF, RFC 791, Sep. 1981, 51 pages.

Deering, S., "Internet Protocol, Version 6 (IPv6) Specification," IETF, RFC 2460, Dec. 1998, 39 pages.

Katz, D., et al., "IP Router Alert Option," IETF, RFC 2113, Feb. 1997, 4 pages.

Partridge, C., et al., "IPv6 Router Alert Option," IETF, RFC 2711, Oct. 1999, 6 pages.

EP Office Action mailed in corresponding EP application No. 22 184 198.4 mailed on Nov. 21, 2022, 3 pages.

First Office Action and Search Report, Chinese Application No. 202210849504.5, Mar. 26, 2024; pp. (9).

Notice of Allowance for corresponding European Application No. 22 184 198.4-1215, dated Jul. 1, 2024, 8 pages.

* cited by examiner

FIG. 8

COMPRESSED
SOURCE ROUTE
OPTION
800

```
COPY  CLASS  NUMBER  LENGTH  DESCRIPTION
----  -----  ------  ------  -----------
 1      0      31     var.   Compressed Source Route
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type(31)   |     Length    |
+-+-+-+-+-+-+-+-+-+-+-+-+-+-+-+-+-+-+-+-+-+-+-+-+-+-+-+-+-+-+-+-+
~                             CSRB 1                            ~
+-+-+-+-+-+-+-+-+-+-+-+-+-+-+-+-+-+-+-+-+-+-+-+-+-+-+-+-+-+-+-+-+
|                                                               |
+                                                               +
~                                                               ~
+-+-+-+-+-+-+-+-+-+-+-+-+-+-+-+-+-+-+-+-+-+-+-+-+-+-+-+-+-+-+-+-+
|                             CSRB P                            |
+-+-+-+-+-+-+-+-+-+-+-+-+-+-+-+-+-+-+-+-+-+-+-+-+-+-+-+-+-+-+-+-+
```

COMPRESSED SOURCE ROUTE BLOCK 900

PROTOCOL STACK 1000

*FIG. 14*

HOP-BY-HOP
OPTIONS
HEADER
1400

```
 +-+-+-+-+-+-+-+-+-+-+-+-+-+-+-+-+-+-+-+-+-+-+-+-+-+-+-+-+-+-+-+-+
 |  Next Header  |  Hdr Ext Len  |                               |
 +-+-+-+-+-+-+-+-+-+-+-+-+-+-+-+-+                               +
 |                                                               |
 .                                                               .
 .                           Options                             .
 .                                                               .
 |                                                               |
 +-+-+-+-+-+-+-+-+-+-+-+-+-+-+-+-+-+-+-+-+-+-+-+-+-+-+-+-+-+-+-+-+
```

*FIG. 15*

TLV ENCODED
OPTION
1500

```
 +-+-+-+-+-+-+-+-+-+-+-+-+-+-+-+-+-+-+-+-+- - - - - - -
 |  Option Type  | Opt Data Len  |  Option Data
 +-+-+-+-+-+-+-+-+-+-+-+-+-+-+-+-+-+-+-+-+- - - - - - -
```

*FIG. 16*

CSR OPTION
1600

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Option Type   | Opt Data Len  |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                            CSRB 1                             +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                            ....  ...                          +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                            CSRB P                             +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

FIG. 18

```
                                                       CSRB
                                                       1800

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            CSRB-I            | Exp |S|         TTL           |
+-+-+-+-+-+-+-+-+-+-+-+-+-+-+-+-+-+-+-+-+-+-+-+-+-+-+-+-+-+-+-+-+
|           Base Label         | Exp |S|         TTL           |
+-+-+-+-+-+-+-+-+-+-+-+-+-+-+-+-+-+-+-+-+-+-+-+-+-+-+-+-+-+-+-+-+
| SOO |    Num Offsets(N)      | Exp |S|         TTL           |
+-+-+-+-+-+-+-+-+-+-+-+-+-+-+-+-+-+-+-+-+-+-+-+-+-+-+-+-+-+-+-+-+
|                                                               |
+                                                               +
//              Offset Label Stack   (Variable)                //
//                                                             //
|                                                               |
+-+-+-+-+-+-+-+-+-+-+-+-+-+-+-+-+-+-+-+-+-+-+-+-+-+-+-+-+-+-+-+-+
```

*FIG. 19*

CSRB
DESCRIPTOR
1900

```
+-+-+-+-+-+-+-+-+-+-+-+-+-+-+-+-+-+-+-+-+-+-+-+-+-+-+-+-+-+-+-+-+
| SOO |    Num Offsets(N)         | Exp |S|       TTL            |
+-+-+-+-+-+-+-+-+-+-+-+-+-+-+-+-+-+-+-+-+-+-+-+-+-+-+-+-+-+-+-+-+
```

*FIG. 20*

OFFSET LABEL
STACK
2000

```
  0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |   Offset 1    |   Offset 2    |   Offset 3    |   Offset 4    |
 +-+-+-+-+-+-+-+-+-+-+-+-+-+-+-+-+-+-+-+-+-+-+-+-+-+-+-+-+-+-+-+-+
//                                                              //
//                                                              //
 +-+-+-+-+-+-+-+-+-+-+-+-+-+-+-+-+-+-+-+-+-+-+-+-+-+-+-+-+-+-+-+-+
 |  Offset N-3   |  Offset N-2   |  Offset N-1   |   Offset N    |
 +-+-+-+-+-+-+-+-+-+-+-+-+-+-+-+-+-+-+-+-+-+-+-+-+-+-+-+-+-+-+-+-+
```

SOURCE ROUTE COMPRESSION

TECHNICAL FIELD

Various example embodiments relate generally to communications and, more particularly but not exclusively, to supporting communications based on source routing.

BACKGROUND

In communication networks, various communications technologies may be used to support various types of communications.

SUMMARY

In at least some example embodiments, an apparatus includes at least one processor and at least one memory including computer program code, wherein the at least one memory and the computer program code are configured to, with the at least one processor, cause the apparatus at least to support communication of a source routed packet over a path from an ingress node to an egress node over a network, wherein the network includes a set of network elements having a respective set of network element identifiers sharing a common prefix, wherein the source routed packet has encoded therein a source route block including the common prefix and an offset list, wherein the offset list includes a set of offset values associated with respective ones of the network elements of the path and configured to be combined with the common prefix to recover the network element identifiers of the respective ones of the network elements of the path. In at least some example embodiments, the set of network elements includes each of the network elements of the network. In at least some example embodiments, the set of network elements forms a subdomain of the network. In at least some example embodiments, the set of network elements includes at least one of a set of nodes or a set of links. In at least some example embodiments, the network element identifiers sharing the common prefix are assigned from one or more blocks of network element identifiers. In at least some example embodiments, the source route block includes an offset size value indicative of a size of each of the offset values in the set of offset values. In at least some example embodiments, the common prefix includes an Internet Protocol (IP) prefix, a Multiprotocol Label Switching (MPLS) label value, or an Ethernet Media Access Control (MAC) Address prefix. In at least some example embodiments, to support communication of the source routed packet, the at least one memory and the computer program code are configured to, with the at least one processor, cause the apparatus at least to determine, at the ingress node, the ones of the network elements of the path, determine, at the ingress node based on the common prefix and the network element identifiers the ones of the network elements of the path, the set of offset values associated with the ones of the network elements of the path, generate, at the ingress node based on the common prefix and the set of offset values associated with ones of the network elements of the path, the source route block, and associate, at the ingress node, the source route block with a header to form the source routed packet. In at least some example embodiments, to support communication of the source routed packet, the at least one memory and the computer program code are configured to, with the at least one processor, cause the apparatus at least to receive, by a node of the path, the source routed packet, determine, by the node based on the common prefix and one of the offset values local to the node, an identifier of a next hop for the source routed packet, and send, by the node, the source routed packet toward the next hop for the source routed packet. In at least some example embodiments, the source route block includes an offset size value indicative of a size of each of the offset values in the set of offset values, wherein the one of the offset values local to the node is determined based on the offset size value. In at least some example embodiments, the identifier of the next hop for the source routed packet is determined by adding the one of the offset values local to the node to the common prefix. In at least some example embodiments, the node of the path includes a transit node of the path or the egress node of the path. In at least some example embodiments, the source route block is encoded using an Internet Protocol version 4 (IPv4) Options Header. In at least some example embodiments, the source route block is encoded using an Internet Protocol version 4 (IPv4) Shim header disposed between an IPv4 Header and a transport layer protocol header. In at least some example embodiments, the source route block is encoded using an Internet Protocol version 6 (IPv6) Extension Header (EH). In at least some example embodiments, the source route block is encoded using an Internet Protocol version 6 (IPv6) Shim header disposed between an IPv6 Header and a transport layer protocol header. In at least some example embodiments, the source route block is encoded using a Multiprotocol Label Switching (MPLS) label stack. In at least some example embodiments, the source route block is associated with a first subdomain of the network, wherein the source routed packet includes a second source route block associated with a second subdomain of the network including a second set of network elements of the path, wherein the second source route block includes a second common prefix for the second subdomain of the network and a second offset list including a second set of offset values associated with ones of the network elements of the path in the second subdomain and configured to be combined with the second common prefix to recover the network element identifiers of ones of the network elements of the path in the second subdomain.

In at least some example embodiments, a computer readable medium stores computer program code configured to cause an apparatus at least to support communication of a source routed packet over a path from an ingress node to an egress node over a network, wherein the network includes a set of network elements having a respective set of network element identifiers sharing a common prefix, wherein the source routed packet has encoded therein a source route block including the common prefix and an offset list, wherein the offset list includes a set of offset values associated with respective ones of the network elements of the path and configured to be combined with the common prefix to recover the network element identifiers of the respective ones of the network elements of the path. In at least some example embodiments, the set of network elements includes each of the network elements of the network. In at least some example embodiments, the set of network elements forms a subdomain of the network. In at least some example embodiments, the set of network elements includes at least one of a set of nodes or a set of links. In at least some example embodiments, the network element identifiers sharing the common prefix are assigned from one or more blocks of network element identifiers. In at least some example embodiments, the source route block includes an offset size value indicative of a size of each of the offset values in the set of offset values. In at least some example embodiments, the common prefix includes an Internet Protocol (IP) prefix, a Multiprotocol Label Switching (MPLS) label value, or an Ethernet Media Access Control (MAC) Address prefix. In at least some example embodiments, to support communication of the source routed packet, the computer program code is configured to cause the apparatus at least to determine, at the ingress node, the ones of the network elements of the path, determine, at the ingress node based on the common prefix and the network element identifiers the ones of the network elements of the path, the set of offset values associated with the ones of the network elements of the path, generate, at the ingress node based on the common prefix and the set of offset values associated with ones of the network elements of the path, the source route block, and associate, at the ingress node, the source route block with a header to form the source routed packet. In at least some example embodiments, to support communication of the source routed packet, the computer program code is configured to cause the apparatus at least to receive, by a node of the path, the source routed packet, determine, by the node based on the common prefix and one of the offset values local to the node, an identifier of a next hop for the source routed packet, and send, by the node, the source routed packet toward the next hop for the source routed packet. In at least some example embodiments, the source route block includes an offset size value indicative of a size of each of the offset values in the set of offset values, wherein the one of the offset values local to the node is determined based on the offset size value. In at least some example embodiments, the identifier of the next hop for the source routed packet is determined by adding the one of the offset values local to the node to the common prefix. In at least some example embodiments, the node of the path includes a transit node of the path or the egress node of the path. In at least some example embodiments, the source route block is encoded using an Internet Protocol version 4 (IPv4) Options Header. In at least some example embodiments, the source route block is encoded using an Internet Protocol version 4 (IPv4) Shim header disposed between an IPv4 Header and a transport layer protocol header. In at least some example embodiments, the source route block is encoded using an Internet Protocol version 6 (IPv6) Extension Header (EH). In at least some example embodiments, the source route block is encoded using an Internet Protocol version 6 (IPv6) Shim header disposed between an IPv6 Header and a transport layer protocol header. In at least some example embodiments, the source route block is encoded using a Multiprotocol Label Switching (MPLS) label stack. In at least some example embodiments, the source route block is associated with a first subdomain of the network, wherein the source routed packet includes a second source route block associated with a second subdomain of the network including a second set of network elements of the path, wherein the second source route block includes a second common prefix for the second subdomain of the network and a second offset list including a second set of offset values associated with ones of the network elements of the path in the second subdomain and configured to be combined with the second common prefix to recover the network element identifiers of ones of the network elements of the path in the second subdomain.

In at least some example embodiments, a method includes supporting communication of a source routed packet over a path from an ingress node to an egress node over a network, wherein the network includes a set of network elements having a respective set of network element identifiers sharing a common prefix, wherein the source routed packet has encoded therein a source route block including the common prefix and an offset list, wherein the offset list includes a set of offset values associated with respective ones of the network elements of the path and configured to be combined with the common prefix to recover the network element identifiers of the respective ones of the network elements of the path. In at least some example embodiments, the set of network elements includes each of the network elements of the network. In at least some example embodiments, the set of network elements forms a subdomain of the network. In at least some example embodiments, the set of network elements includes at least one of a set of nodes or a set of links. In at least some example embodiments, the network element identifiers sharing the common prefix are assigned from one or more blocks of network element identifiers. In at least some example embodiments, the source route block includes an offset size value indicative of a size of each of the offset values in the set of offset values. In at least some example embodiments, the common prefix includes an Internet Protocol (IP) prefix, a Multiprotocol Label Switching (MPLS) label value, or an Ethernet Media Access Control (MAC) Address prefix. In at least some example embodiments, supporting communication of the source routed packet includes determining, at the ingress node, the ones of the network elements of the path, determining, at the ingress node based on the common prefix and the network element identifiers the ones of the network elements of the path, the set of offset values associated with the ones of the network elements of the path, generating, at the ingress node based on the common prefix and the set of offset values associated with ones of the network elements of the path, the source route block, and associating, at the ingress node, the source route block with a header to form the source routed packet. In at least some example embodiments, supporting communication of the source routed packet includes receiving, by a node of the path, the source routed packet, determining, by the node based on the common prefix and one of the offset values local to the node, an identifier of a next hop for the source routed packet, and sending, by the node, the source routed packet toward the next hop for the source routed packet. In at least some example embodiments, the source route block includes an offset size value indicative of a size of each of the offset values in the set of offset values, wherein the one of the offset values local to the node is determined based on the offset size value. In at least some example embodiments, the identifier of the next hop for the source routed packet is determined by adding the one of the offset values local to the node to the common prefix. In at least some example embodiments, the node of the path includes a transit node of the path or the egress node of the path. In at least some example embodiments, the source route block is encoded using an Internet Protocol version 4 (IPv4) Options Header. In at least some example embodiments, the source route block is encoded using an Internet Protocol version 4 (IPv4) Shim header disposed between an IPv4 Header and a transport layer protocol header. In at least some example embodiments, the source route block is encoded using an Internet Protocol version 6 (IPv6) Extension Header (EH). In at least some example embodiments, the source route block is encoded using an Internet Protocol version 6 (IPv6) Shim header disposed between an IPv6 Header and a transport layer protocol header. In at least some example embodiments, the source route block is encoded using a Multiprotocol Label Switching (MPLS) label stack. In at least some example embodiments, the source route block is associated with a first subdomain of the network, wherein the source routed packet includes a second source route block associated with a second subdomain of the network including a second set of network elements of the path, wherein the second source route block includes a second common prefix for the second subdomain of the network and a second offset list including a second set of offset values associated with ones of the network elements of the path in the second subdomain and configured to be combined with the second common prefix to recover the network element identifiers of ones of the network elements of the path in the second subdomain.

In at least some example embodiments, an apparatus includes means for supporting communication of a source routed packet over a path from an ingress node to an egress node over a network, wherein the network includes a set of network elements having a respective set of network element identifiers sharing a common prefix, wherein the source routed packet has encoded therein a source route block including the common prefix and an offset list, wherein the offset list includes a set of offset values associated with respective ones of the network elements of the path and configured to be combined with the common prefix to recover the network element identifiers of the respective ones of the network elements of the path. In at least some example embodiments, the set of network elements includes each of the network elements of the network. In at least some example embodiments, the set of network elements forms a subdomain of the network. In at least some example embodiments, the set of network elements includes at least one of a set of nodes or a set of links. In at least some example embodiments, the network element identifiers sharing the common prefix are assigned from one or more blocks of network element identifiers. In at least some example embodiments, the source route block includes an offset size value indicative of a size of each of the offset values in the set of offset values. In at least some example embodiments, the common prefix includes an Internet Protocol (IP) prefix, a Multiprotocol Label Switching (MPLS) label value, or an Ethernet Media Access Control (MAC) Address prefix. In at least some example embodiments, the means for supporting communication of the source routed packet includes means for determining, at the ingress node, the ones of the network elements of the path, means for determining, at the ingress node based on the common prefix and the network element identifiers the ones of the network elements of the path, the set of offset values associated with the ones of the network elements of the path, means for generating, at the ingress node based on the common prefix and the set of offset values associated with ones of the network elements of the path, the source route block, and means for associating, at the ingress node, the source route block with a header to form the source routed packet. In at least some example embodiments, the means for supporting communication of the source routed packet includes means for receiving, by a node of the path, the source routed packet, means for determining, by the node based on the common prefix and one of the offset values local to the node, an identifier of a next hop for the source routed packet, and means for sending, by the node, the source routed packet toward the next hop for the source routed packet. In at least some example embodiments, the source route block includes an offset size value indicative of a size of each of the offset values in the set of offset values, wherein the one of the offset values local to the node is determined based on the offset size value. In at least some example embodiments, the identifier of the next hop for the source routed packet is determined by adding the one of the offset values local to the node to the common prefix. In at least some example embodiments, the node of the path includes a transit node of the path or the egress node of the path. In at least some example embodiments, the source route block is encoded using an Internet Protocol version 4 (IPv4) Options Header. In at least some example embodiments, the source route block is encoded using an Internet Protocol version 4 (IPv4) Shim header disposed between an IPv4 Header and a transport layer protocol header. In at least some example embodiments, the source route block is encoded using an Internet Protocol version 6 (IPv6) Extension Header (EH). In at least some example embodiments, the source route block is encoded using an Internet Protocol version 6 (IPv6) Shim header disposed between an IPv6 Header and a transport layer protocol header. In at least some example embodiments, the source route block is encoded using a Multiprotocol Label Switching (MPLS) label stack. In at least some example embodiments, the source route block is associated with a first subdomain of the network, wherein the source routed packet includes a second source route block associated with a second subdomain of the network including a second set of network elements of the path, wherein the second source route block includes a second common prefix for the second subdomain of the network and a second offset list including a second set of offset values associated with ones of the network elements of the path in the second subdomain and configured to be combined with the second common prefix to recover the network element identifiers of ones of the network elements of the path in the second subdomain.

BRIEF DESCRIPTION OF THE DRAWINGS

The teachings herein can be readily understood by considering the following detailed description in conjunction with the accompanying drawings, in which:

FIG. 8 depicts an example embodiment of a Compressed Source Route Option for use in the IPv4 Header of FIG. 7 to provide a Compressed Source Route for source route compression;

FIG. 14 depicts an example embodiment of a Hop-By-Hop Options Header for use in the IPv6 Header of FIG. 13 to provide a Compressed Source Route for source route compression;

FIG. 15 depicts an example embodiment of a Type-Length-Value (TLV) encoded option for use in the Hop-By-Hop Options Header of FIG. 14 to provide a Compressed Source Route for source route compression;

FIG. 16 depicts an example embodiment of a Compressed Source Route Option, based on the TLV encoded option of FIG. 15, for use in the Hop-By-Hop Options Header of FIG. 14 to provide a Compressed Source Route for source route compression;

FIG. 18 depicts an example embodiment of a Compressed Source Route Block for use to provide a Compressed Source Route for source route compression in a Multiprotocol Label Switching (MPLS)-based network;

FIG. 19 depicts an example embodiment of a Compressed Source Route Block Descriptor configured for use in the Compressed Source Route Block of FIG. 18 to provide a Compressed Source Route for source route compression in an MPLS-based network;

FIG. 20 depicts an example embodiment of an Offset Label Stack configured for use in the Compressed Source Route Block of FIG. 18 to provide a Compressed Source Route for source route compression in an MPLS-based network;

To facilitate understanding, identical reference numerals have been used herein, wherever possible, in order to designate identical elements that are common among the various figures.

DETAILED DESCRIPTION

Various example embodiments for supporting source routing are presented herein. Various example embodiments for supporting source routing may be configured to support source route compression for source routing. Various example for supporting source route compression for source routing may be configured to support communication of a source routed packet over a path from an ingress node to an egress node over a network, wherein the network includes a set of network elements having a respective set of network element identifiers sharing a common prefix, wherein the source routed packet has encoded therein a source route block including the common prefix and an offset list, wherein the offset list includes a set of offset values associated with respective ones of the network elements of the path and configured to be combined with the common prefix to recover the network element identifiers of the respective ones of the network elements of the path. It will be appreciated that these and various other example embodiments and advantages or potential advantages of supporting source routing may be further understood by way of reference to the various figures, which are discussed further below.

Figure 1:
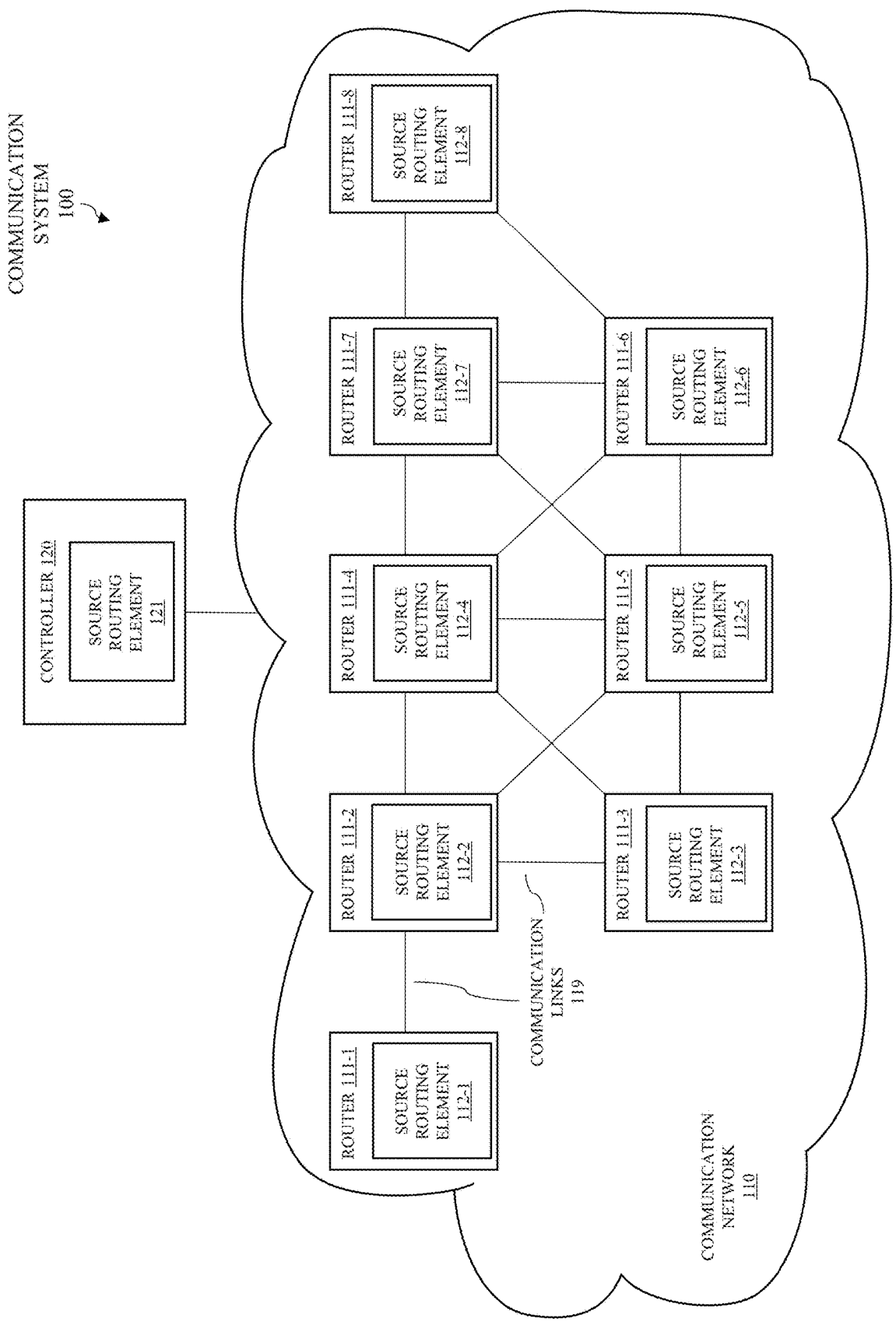
FIG. 1 depicts an example embodiment of a communication system configured to support source routing based on source route compression.

FIG. 1 depicts an example embodiment of a communication system configured to support source routing based on source route compression.

The communication system 100 includes a communication network 110 and a controller 120. The communication network 110 is a packet-switched network including a set of routers 111-1-111-8 (collectively, routers 111, which are also referred to herein using the notation Rx) and a set of communication links 119 via which the routers 111 are communicatively connected. The communication network 110 is configured to support various data plane and control plane functions for supporting communication of traffic including communication of source routed packets. The communication network 110 is configured to support source routing of packets using source route compression. The routers 111 are configured to support source routing of packets using source route compression. The routers 111-1-111-8 include source routing elements 112-1-112-8 (collectively, source routing elements 112), respectively, which are configured to support source routing of packets using source route compression. The controller 120 is configured to provide various control functions for the communication network 110 (e.g., maintaining network topology and traffic engineering information, computing source routes for ingress routers in the communication network 110, or the like, as well as various combinations thereof) including control functions configured to support source routing of packets by routers 111 of communication network 110 based on source route compression. The controller 120 includes a source routing element 121 configured to support source routing of packets, based on source route compression, by routers 111 of communication network 110. Various example embodiments for supporting source route compression within the communication network 110 may be further understood by first considering various aspects of packet switched networks configured to support source routing.

Packet-switched networks are built on mesh topologies in which multiple paths to a destination exist. The links in the mesh are point-to-point links joined by nodes. A path to a destination may go through any number of nodes, and the path may change at any time due to traffic problems or failed links. In this environment, there are two possible packet routing methods: hop-by-hop destination-based routing and source routing.

Hop-by-hop, destination-based routing is like getting directions along the way. A packet has a destination address. Each node looks at the address and makes a routing decision about how to forward the packet. Thus, decisions are made on a hop-by-hop basis in the network until the packet reaches its destination.

Source Routing, also called explicit path addressing, allows a head-end node to partially or completely specify the route the packet takes through the network. The head-end node discovers an explicit path for a packet flow through the network in advance of sending packets. The explicit path is "encoded" into the packet and transit nodes forward packet based on that path. Source Routing minimizes the states required in transit nodes to forward a packet, since each node only maintains forwarding information to one of its next-hops and is not required to maintain forwarding information to each possible packet destination. An example of a generic method of source routing, described within the context of FIG. 1, follows.

For the generic method of source routing, in FIG. 1, assume that R1 (head-end node) decides to send a packet along the path R1-R2-R4-R7-R8. Assume that R1, R2, R3 . . . , R8 are loopback addresses assigned as node identifiers. So, R1 encodes the explicit path with node identifiers as {R2, R4, R7, R8} into the packet and sends to R2. When R2 receives the packet, it looks up the first hop in the explicit path, which is R2. Since the first hop R2 identifies itself, it pops the first hop. It then looks up the new first hop, which is R4, and forwards the packet to R4 with the explicit path in the packet as {R4, R7, R8}. R4 pops the first hop in the explicit path, which is R4, since it identifies itself. R4 then looks up the new first hop, which is R7, and forwards the packet to R7 with the explicit path {R7, R8}. When R7 receives the packet, it pops the first hop, which is R7, since it identifies itself. It then looks up the new first hop, which is R8, and forwards the packet to R8 with the explicit path {R8}. When R8 receives the packet, it pops the first hop, which is R8, since it identifies itself. As discussed further below, source routing may be performed using a loose source routing and/or a strict source routing.

In loose source routing, the head-end node can encode a set of nodes to be traversed and intermediate nodes along the path can choose among multiple paths to reach any nodes in the set of nodes. For example, in the example of the generic method of source routing described above, R2 may find the "optimal" path to R4 is via R2-R3-R4 instead of R2-R4. In this case, R2 will send explicit path {R3, R4, R7, R8} to R3. When R3 receives the packet and finds the first hop in the path as R3, it would pop R3, since it identifies itself. R3 then looks up the new next-hop, which is R4, and sends the packet with path {R4, R7, R8} to R4. So, when an explicit path contains one or more node identifier(s) then the path is called a loose source route since an intermediate node can choose one among the multiple paths to reach the a node, which is a loopback address in that node.

In strict source routing, the head-end node can encode a set of hops to be traversed and intermediate nodes along the path forward based on the specified hops. For example, in the example of the generic method of source routing described above, R1 encodes a set of next-hop identifiers such as {R2→R4, R4→R7, R7→R8} to specify the path to be taken by the packet. When R2 receives the packet, it looks up the first hop in the explicit path, which is R2→R4. Since R2→R4 identifies the directly connected link, so R2 pops the first hop from the explicit path. It forwards the packet on the R2→R4 link. Similarly, when R4 receives the packet it forwards the packet to R7. When R7 receives the packet is forwards the packet to R8. In this manner, the exact path traversed by the packet is specified by the source node R1.

It will be appreciated, as indicated above, that a source node also may specify a mix of loose hops and strict hops. For example, in the example of the generic method of source routing described above, R1 can also specify a mix of strict and loose hops such as {R2→R4, R8}. It will be appreciated that strict source routing is preferable when a packet belonging to a service or application that needs to meet strict Quality of Service (QoS) or Service Level Agreement (SLA) and, thus, must follow a strict path. So, strict source routing is the default choice for source routing with traffic engineering (TE). A description of source routing with traffic engineering (SR-TE) follows.

In SR-TE, various TE parameters are assigned into the network elements (e.g., the nodes and links). The TE parameters of a network element describe the cost, delay, throughput, available bandwidth, packet loss characteristics etc. of the network element. The topology and TE parameters of all network elements are learned and are maintained in a centralized TE Database (TEDB) hosted by a controller (e.g. a Path Computation Element (PCE), a Software Defined Networking (SDN) controller, or the like). The controller can learn topology and TE information by listening to link-state advertisements (LSAs) from the Interior Gateway Protocol (IGP) running among the routers (e.g., Intermediate-System-to-Intermediate-System (ISIS), Open Shortest Path First (OSPF), or the like). The controller can also gather such information from the routers, e.g., using Border Gateway Protocol-Link State (BGP-LS) such as in RFC 7752, using a push/pull mechanism or the like, as well as various combinations thereof.

In SR-TE, the head-end node classifies packets into flows based on application or a service. Each flow is associated with specific QoS requirement or SLA. The head-end node sends a request to the controller (e.g., PCE, SDN controller, or the like) to compute an optimal/explicit path that meets the specified QoS/SLA. The controller typically computes such a path by running Constraint Shortest Path First (CSPF) techniques on the TE DB. Once a path is allocated, the controller updates the dynamic TE state (e.g. residual bandwidth) of the network elements along that path into the TEDB. The head-end node sends all packets belonging to a flow over the explicit path that meets the QoS/SLA of the flow. The explicit path is encoded into the packet. Thus, it is possible that packets of different flows to same destination follow diversified paths. The per-flow states are maintained only at the head-end node and transit nodes are completely agnostic of a flow, the QoS/SLA needs of the flow, and so forth. This results in a significant reduction of cost and complexity at transit nodes.

In recent years, Source Routing, which was typically used for Internet Protocol version 4 (IPv4), has been revamped as Segment Routing (SR) by extending source routing capabilities into Multiprotocol Label Switching (MPLS) and IP version 6 (IPv6). In SR, the loopback address of a router is referred to as a "Prefix Segment" and next-hop adjacency/ link between two routers is referred to as an "Adjacency Segment". In SR, each segment is assigned a Segment Identifier (SID), which is encoded into an explicit path to identify the segment. SR using an MPLS dataplane is described in RFC 8660 and SR using an IPv6 dataplane is described in RFC 8754. There is no explicit specification for SR using an IPv4 dataplane, since SR uses the IPv4 source routing described in the base IPv4 specification RFC 791. It is noted that, since SR includes SR-TE aspects, the term "SR" as used herein, unless indicated otherwise, includes SR-TE as well.

In SR using an MPLS dataplane, packet flows are enforced through a specific path by applying, at the ingress node, a specifically designed stack of segment identifiers (SIDs) fully compatible with the MPLS data plane. The stack of SIDs is referred to as a "segment list" and corresponds to the stack of labels in the MPLS architecture. The ingress router sends a packet with the list of SIDs (stack of labels) wherein each SID indicates a next-hop or router to be traversed by the packet. Only the top SID in the list is processed during packet forwarding by transit nodes. Each packet is forwarded along the shortest path toward the network element represented by the top SID. For example, a Prefix-SID can represent an Equal Cost Multipath (ECMP)-aware shortest-path to an IGP prefix (i.e., IGP-Prefix) which identifies a specific router (i.e., IGP-Node Segment). For example, an Adjacency-SID represents a hop over a specific adjacency between two nodes in the IGP (i.e., IGP-Adjacency Segment). A Prefix Segment is typically a multi-hop path while an Adjacency Segment, in most cases, is a one-hop path. Unlike traditional MPLS networks, SR maintains per-flow state only at the ingress node, where the segment list is applied. Therefore, no signaling protocol (e.g., Resource Reservation Protocol with traffic engineering extensions—RSVP-TE) is required to populate the forwarding table of transit nodes. In this way, a simplified control plane is employed, just relying on the IGP that is properly extended to advertise SIDs as additional attributes of LSAs. Thus, scalability of transit nodes is greatly improved, since MPLS Label Switch Paths (LSPs) state information is not required.

In SR using an IPv6 dataplane, similar to SR using an MPLS dataplane, packet flows are enforced through a specific path by applying, at the ingress node, a specifically designed stack of SIDs. In SR using an IPv6 dataplane, however, SIDs are encoded into the packet as IPV6 addresses assigned to Adjacency Segments or Node Segments.

In SR-TE, a strict-hop path would consist of a stack of Adjacency-SIDs where each such SID will designate a strict hop to be traversed. Thus, in SR, a packet traversing 30 strict next-hops will start from the head-end with a label stack of 30 labels in an MPLS dataplane and list of 30 IPV6 addresses in an IPv6 dataplane.

It is noted that, herein, generic source routing specific terminology, rather than SR-specific terminology, is primarily used. For example, a node or a link between two nodes, unless otherwise specified, is generically referred to herein as a "network element" and a network element encoded in the source route is referred to as a "hop" in the source route path.

Various example embodiments may be configured to support a compressed form of encoding a source route into a packet, which can be applied to any packet switching technology (e.g., IPv4, IPv6, MPLS, Ethernet, or the like). Various example embodiments may be configured to provide a generic and efficient mechanism to compress a source route in a manner configured to impose the least overhead in a packet irrespective of whether the source routed network is based on IPv4, IPv6, MPLS, Ethernet, or the like.

Various example embodiments may support a compressed form of encoding a source route into a packet based on assignment of identifiers to network elements where the identifiers share a common prefix (also referred to herein as a shared prefix). The identifiers of the network elements may be assigned one or more blocks of identifiers, multiple contiguous or non-contiguous blocks of identifiers, or the like, as well as various combinations thereof. For example, assume that a common IPv4 prefix 10.10.10.0/24, which can be used for addressing up to 255 network elements, may be used for assigning identifiers to 200 network elements and the identifiers may be assigned from two non-contiguous blocks by assigning 100 identifiers from the block 10.10.10.1-10.10.10.100 and assigning 100 identifiers from the block 10.10.10.130-10.10.10.230. It will be appreciated that network elements may use various other types and arrangements of identifiers sharing a common prefix. The use of network elements having identifiers that share a common prefix enables the identifier of a network element to be represented as {Shared_Prefix, Offset} where 'Shared_Prefix' is the common prefix of the network element and 'Offset' is the offset of the identifier of the network element in Shared_Prefix. So, the identifier of the network element may be computed as Shared_Prefix+Offset. This enables a source route to be represented as a list of offsets of the network elements of which the source route is composed. It will be appreciated that this may be applied to all or part of a network, may be applied to one or more network partitions where a network is partitioned (as discussed further below), or the like, as well as various combinations thereof).

Various example embodiments may support a compressed form of encoding a source route into a packet based on partitioning of the source routed network into "areas" of network elements (e.g., nodes and links). In each area, one or more blocks of identifiers is allocated to the area and network elements in the area are assigned identifiers from the one or more allocated blocks of identifiers. This enables the identifier of a network element in an area to be represented as {Shared_Prefix, Offset} where 'Shared_Prefix' is the common prefix in the one or more blocks of identifiers in the area and 'Offset' is the offset of the identifier in Shared_Prefix. So, an identifier is computed as Shared_Prefix+Offset. This is illustrated in FIG. 2, which uses the same topology from FIG. 1, but where the topology has been partitioned into two areas.

Figure 2:
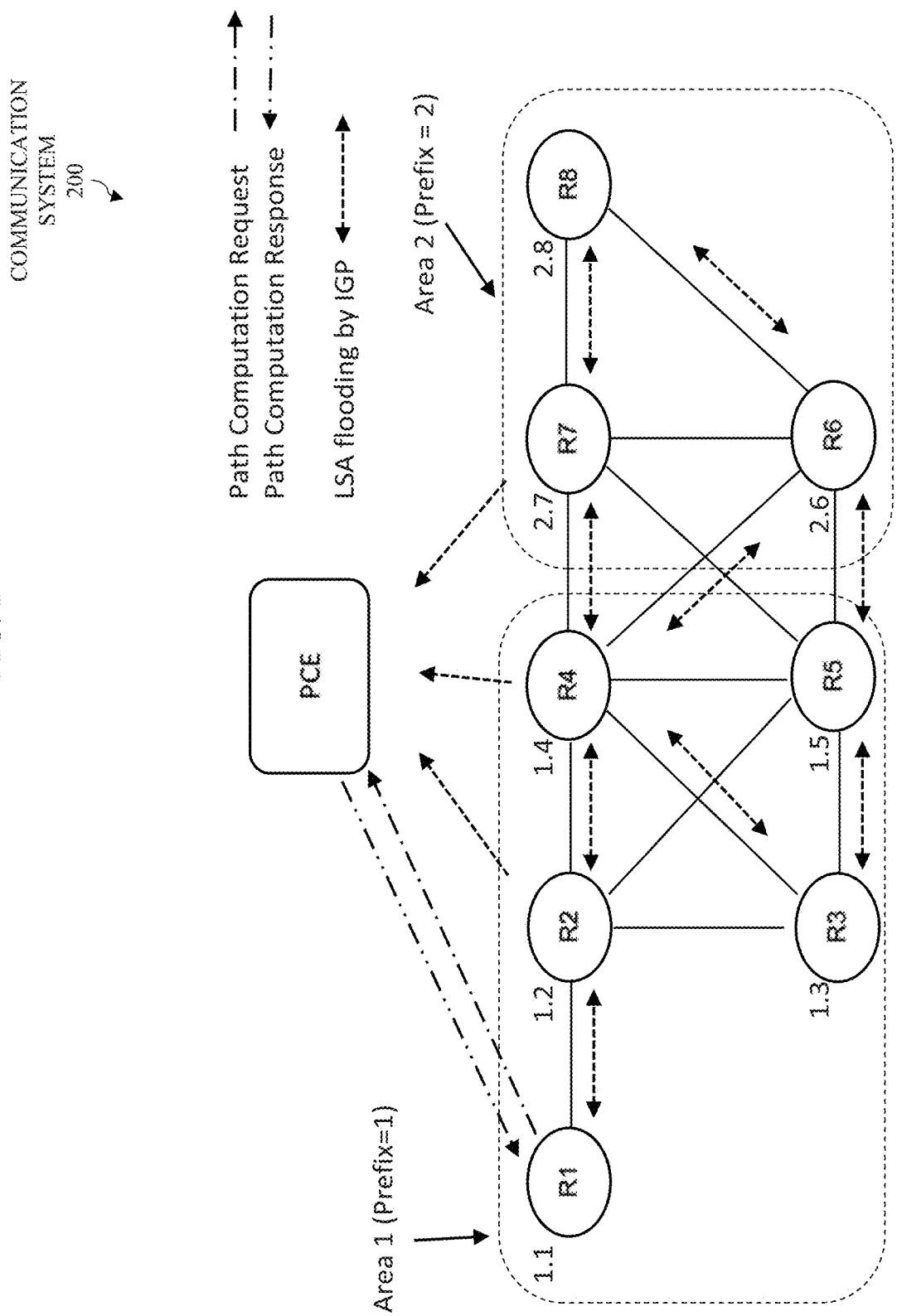
FIG. 2 depicts an example embodiment of a communication system configured to support source routing based on source route compression.

FIG. 2 depicts an example embodiment of a communication system configured to support source routing based on source route compression.

In FIG. 2, communication system 200 is similar to the communication system 100 of FIG. 1. The communication system 200 includes the same routers as in FIG. 1, and includes a PCE configured to operate as the controller of FIG. 1.

In FIG. 2, nodes R1-R5 are in Area 1 and nodes R6-R8 are in Area 2. Network elements in Area 1 share the common prefix '1' and network elements in Area 2 share the common prefix '2'. In FIG. 2, the identifiers are shown in the notation of Shared_Prefix.Offset (e.g., the identifier of node Rx is Shared_Prefix_of_Rx.X and the identifier of the link between Rx and Ry is the Shared_Prefix_of_Rx.XY). A few example identifiers are as follows: (1) Node R3=1.3, (2) Node R6=2.6, and (3) Link R4→R7=1.47.

In this way, the network elements in an area can be represented as an offset to the Shared_Prefix. This allows the segment of a source route within an area to be encoded as the tuple {Shared_Prefix, Size_Of_Offset, Offset_List[ ]}, where 'Offset_List[ ]' is the list of the offsets of the hops in the path and 'Size_Of_Offset' is the length of an entry in the Offset_List[ ] in bytes. Then, the identifier of the hop 'n' in the path is computed as Shared_Prefix+Offset_List[n]. This encoding is referred to herein as a Compressed Source Route Block (CSRB). A Compressed Source Route (CSR) includes one or more CSR Blocks where each block represents the hops in an area within the source route. A generic encoding of CSR Block for an area is illustrated in FIG. 3 and a generic format of a CSR for a packet is illustrated in FIG. 4, both of which can be extrapolated to any packet switching technology.

Figure 3:
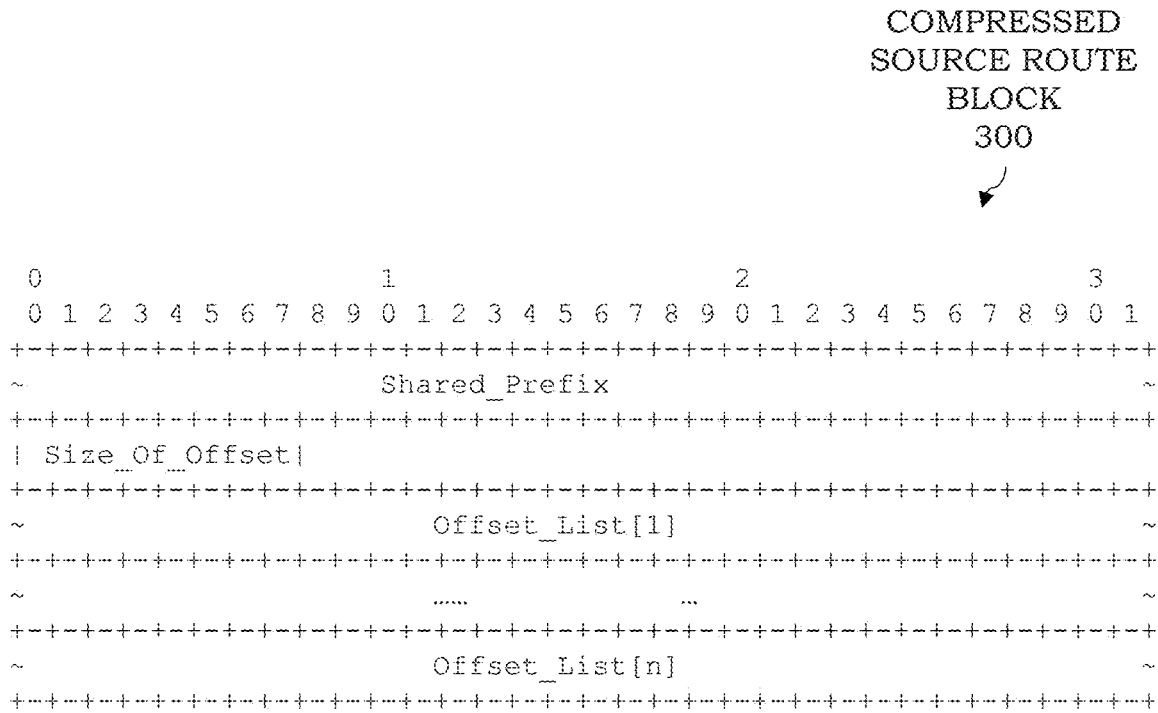
FIG. 3 depicts an example embodiment of a compressed source route block configured to support source route compression.

In FIG. 3, the CSR Block 300 includes a Shared_Prefix field, a Size_of_Offset field, and an Offset_List[ ] including [n] Offset_List fields (denoted as Offset_List[1]—Offset_List[n]). In FIG. 3, the Size_of_Offset field can be encoded in various ways. For example, the Size_of_Offset field can be encoded with the following values: (a) 1=size of an entry in Offset_List[ ] is 1 B and (b) 2=size of an entry in Offset_List[ ] is 2 B. For example, the Size_of_Offset field can be encoded by the number of bits in an entry in Offset_List[ ].

Figure 4:
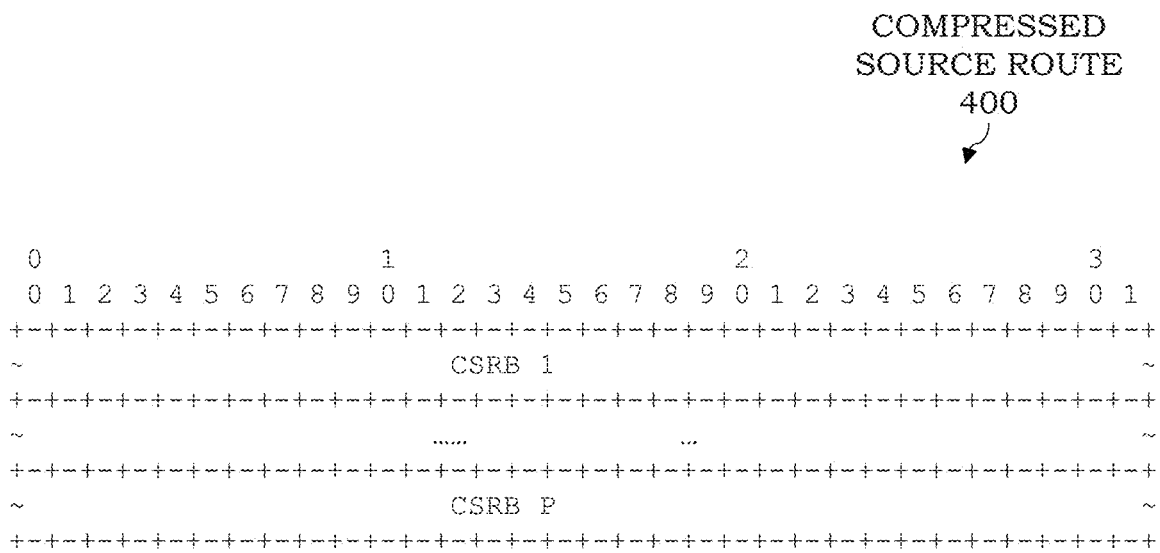
FIG. 4 depicts an example embodiment of a Compressed Source Route configured to support source route compression.

In FIG. 4, the CSR 400 includes P CSRBs associated with P areas of the network to be traversed by the packet including the CSR (denoted as CSRB 1 through CSRB P). It will be appreciated that each of the CSRBs depicted in FIG. 4 may be encoded as a CSRB presented with respect to FIG. 3 (i.e., in the CSR, each CSRB can include n Offset_List entries for the n network elements of the area with which the CSRB is associated).

If the size of an entry in Offset_List[ ] is chosen as 1 B, then up to 256 network elements can be included in an area. If the size of an entry in Offset_List[ ] is chosen as 2 B, then up to 65535 network elements can be included in an area, which is typically more than the number of network elements in a typical source routed network. So, with a 2 B size, the entire network can be accommodated within a single area and, thus, the CSR would include only one CSRB.

The concept of CSR is illustrated with the generic example of FIG. 2. For example, assume that a strict source route is {R1→R2, R2→R4, R4→R7, R7→R8}. Since the path traverses two areas, the CSR would include two CSR Blocks. The encoding of the CSR would be: {CSR Block 1={Shared_Prefix=1, Size_Of_Offset=1, Offset_List [ ]= {12, 24, 47}}, CSR Block 2={Shared_Prefix=2, Size_Of_Offset=1, Offset_List[ ]={78}}}.

It is noted that, in IPv4 and IPv6, the concept of subnetting is already used in allocation of IP addresses to network elements, so an IP subnet can be assigned to an area for allocation of the identifiers for its network elements. Then, all network elements in an area can be represented as offset to the IP prefix of the subnet.

The compression which may be achieved based on use of a CSR in an IPv4 network may be understood with respect to the following examples. In an existing IPv4 source route, 30 hops consumes 30×4 B=120 B. As a first example, assume that, in an IPv4 source routed network, an area is assigned a subnet 10.10.10.0/24. So, the area can have up to 255 network elements. Here, further assume that a source route of 30 hops traverses only through that single area, which would be the best case. In that case, Shared_Prefix=10.10.10.0 (of length 4 B) and Size_Of_Offset=1. Then, the total size of the CSR is: 4 B of Shared_Prefix+1 B of Size_Of_Offset+30×1 B of Offset_List[ ]=35 B. So, here, compared with an existing IPv4 source route, CSR offers a compression of (120-35)×100/120=70.83%. As a second example, assume that in an IPv4 source routed network, the subnet is 10.10.0.0/16. So, the area can have up to 65535 network elements and the entire source routed network can be accommodated within a single area. In that case, the total size of the CSR for any source route is: 4 B of Shared_Prefix+1 B of Size_Of_Offset+30×2 B of Offset_List[ ]=65 B. So, here, compared with an existing IPv4 source route, CSR offers a compression of (120-65)×100/120=45.83%. Thus, it is evident that IPv4 source routing gains a significant benefit from use of source route compression.

The compression which may be achieved based on use of a CSR in an IPv6 network may be understood with respect to the following examples. In an existing IPv6 source route, 30 hops consume 30×16 B=480 B. As a first example, assume that, in an IPv6 source routed network, an area is assigned a subnet IPv6_Prefix/120. So, the area can have up to 255 network elements. Here, further assume that a source route of 30 hops traverses only through that single area, which would be the best case. In that case, Shared_Prefix=IPv6_Prefix (of length 16 B) and Size_Of_Offset=1. Then, the total size of the CSR is: 16 B of Shared_Prefix+1 B of Size_Of_Offset+30×1 B of Offset_List[ ]=47 B. So, here, compared with an existing IPv6 source route, CSR offers a compression of (480-47)×100/480=90.2%. As a second example, assume that, in an IPv6 source routed network, the subnet is IPv6_Prefix/112. So, the area can have up to 65535 network elements and the entire source routed network can be accommodated within a single area. In that case, the total size of CSR for any source route is: 16 B of Shared_Prefix+1 B of Size_Of_Offset+30× 2 B of Offset_List[ ]=77 B. So, here, compared with an existing IPv6 source route, CSR offers a compression of (480-77)×100/480=84%. Thus, it is evident that IPv6 source routing gains a significant benefit from use of source route compression.

The compression which may be achieved based on use of a CSR in an MPLS network may be understood with respect to the following examples. In an existing MPLS source route, 30 hops consumes 30×4 B=120 B. In MPLS networks, the global label space can be used for allocation of subnetted labels to areas (e.g., each area is assigned a block of labels to be assigned to its network elements). The 20 bit label value can be segregated into {Shared_Prefix, Offset}. As a first example, assume that, in an MPLS source routed network, an area is assigned a label block with subnet label_prefix/24. So, the area can have up to 255 network elements. Here, further assume that a source route of 30 hops traverses only through that single area, which would be the best case. In that case, Shared_Prefix=label_prefix (of length 4 B) and Size_Of_Offset=1. Then, the total size of the CSR is: 4 B of Label_Prefix+1 B of Size_Of_Offset+30×1 B of Offset_List[ ]=35 B. So, here, compared with an existing MPLS source route, CSR offers a compression of (120-35)× 100/120=70.83%. As a second example, assume that, in an MPLS source routed network, an area is assigned a label block with subnet label_prefix/16. So, the area can have up to 65535 network elements and the entire source routed network can be accommodated by a single area. In that case, the total size of CSR for any source route is: 4 B of Shared_Prefix+1 B of Size_Of_Offset+30×2 B of Offset_List[ ]=65 B. So, here, compared with an existing MPLS source route, CSR offers a compression of (120-65)×100/120=45.83%.

The compression which may be achieved based on use of a CSR in an Ethernet network may be understood with respect to the following example. In an existing Ethernet source route, 30 hops consumes 30×6 B=180 B, where each hop is identified by a 6 B Media Access Control (MAC) address. In an Ethernet network, it is possible to allocate virtual MAC addresses to the network elements in an area using sub-netting techniques. For example, assume that, in an Ethernet source routed network, an area is assigned a subnet of virtual MAC addresses as MAC_Prefix/40. So, the area can have up to 255 network elements. Here, further assume that a source route of 30 hops traverses only through that single area, which is the best case. In that case, Shared_Prefix=MAC_Prefix (of length 6 B) and Size_Of_Offset=1. Then, the total size of the CSR is: 6 B of Shared_Prefix+1 B of Size_Of_Offset+30×1 B of Offset_List[ ]=~37 B. So, here, compared with an existing Ethernet source route, CSR offers a compression of (180–37)×100/180=79.44%.

It will be appreciated that, although primarily presented herein within the context of using source route compression within the context of source routing of unicast packets, source route compression may be used within the context of source routing of stateless multicast packets where the source route encodes the list of network elements in the multicast tree.

Figure 5:
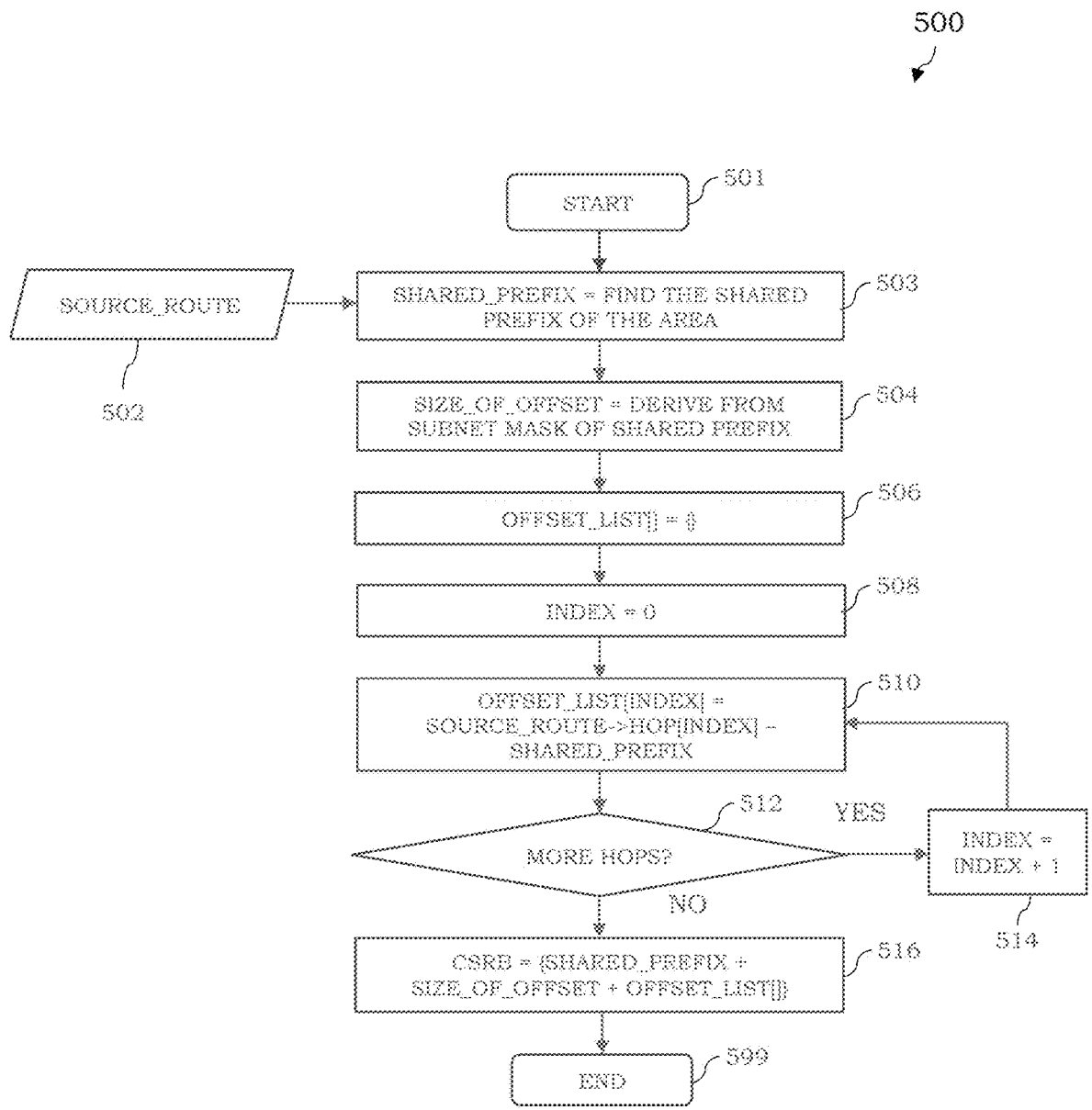
FIG. 5 depicts an example embodiment of a method for construction of a Compressed Source Route by an ingress node of the source route.

FIG. 5 depicts an example embodiment of a method for construction of a compressed source route by an ingress node of the source route. In FIG. 5, for simplicity, it is assumed that the source route traverses only a single area; however, it will be appreciated that method 500 of can be readily extrapolated to a source route spanning multiple areas. The input to the method 500 is a source route with the list of hops to be traversed. At block 501, the method 500 begins. The input 502 to the method 500 is a source route with the list of hops to be traversed. Block 503 finds the Shared_Prefix for the area associated with the source route, and the method 500 then proceeds to block 504. Block 504 derives the Size_Of_Offset from the subnet mask associated with the Shared_Prefix, and the method 500 then proceeds to block 506. Block 506 initializes an empty Offset_List[ ], and the method 500 then proceeds to block 508. Block 508 initializes an index variable to index into the hops in the Source Route and Offset_List[ ], and the method 500 then proceeds to 510. Block 510 sets the Offset_List[ ] entry for the index by decrementing the Shared_Prefix from the hop in the Source Route for the same index, and the method 500 then proceeds to block 512. Block 512 checks if there are more hops in the Source Route to be converted into an entry in Offset_List[ ]. If there are more hops in the Source Route to be converted into an entry in Offset_List[ ] then the method 500 proceeds to block 514, otherwise the method 500 proceeds to block 516. Block 514 increments the index by one and the method 500 then returns to block 510 to repeat the blocks for next hop. Block 516 builds the CSRB/CSR from Shared_Prefix, Size_Of_Offset and Offset_List[ ]. From block 516, the method 500 proceeds to block 599. At block 599, the method 500 ends.

Figure 6:
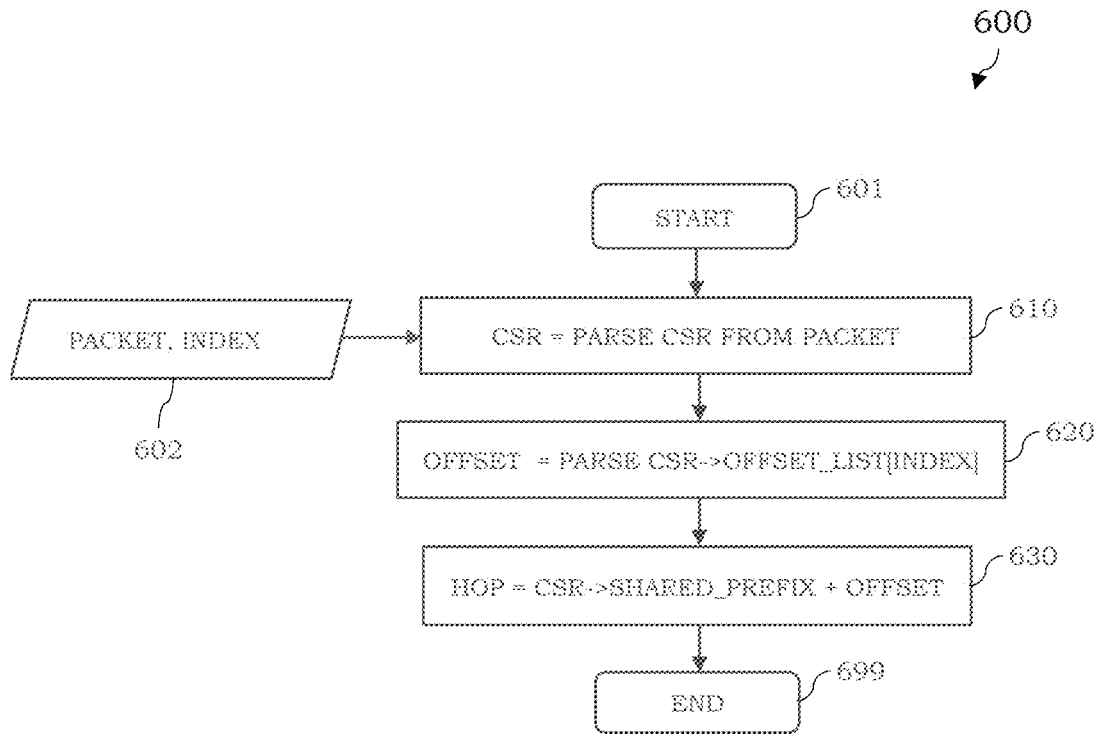
FIG. 6 depicts an example embodiment of a method for generation of a hop identifier by a transit node or egress node of the source route based on a Compressed Source Route.

FIG. 6 depicts an example embodiment of a method for generation of a hop identifier by a transit node or egress node of the source route based on a compressed source route. In FIG. 6, for simplicity, it is assumed that the CSR carries only one CSRB (i.e., the source route spans one area); however, it will be appreciated that method 600 of can be readily extrapolated to a CSR carrying multiple CSRBs (i.e., a source route spanning multiple areas). At block 601, the method 600 begins. The inputs 602 to the method 600 are (1) a CSR encoded packet and (2) an Index to the offset of the hop in CSR. Block 610 parses the CSR from the packet, and the method 600 then proceeds to block 620. Block 620 parses the offset value in the CSRB at the specified index. This block takes into account the Size_Of_Offset value in the CSRB to parse the value. From block 620, the method 600 proceeds to block 630. Block 630 generates the hop identifier by adding the offset value to the Shared_Prefix in the CSRB. From block 630, the method 600 proceeds to block 699. At block 699, the method 600 ends.

Various example embodiments may be configured to support implementation of CSR in IPv4 networks. Various example embodiments may be configured to support implementation of CSR in IPv4 networks in various ways (e.g., based on implementation of CSR as an IPv4 Option, based on implementation of CSR as an IP-Shim Protocol, or the like, as well as various combinations thereof).

Various example embodiments may be configured to support implementation of CSR in IPv4 networks based on implementation of CSR as an IPv4 Option.

IPv4 supports several Options that can be appended to an IPv4 Header, and various example embodiments may be configured to support implementation of CSR in IPv4 networks based on implementation of CSR as an IPv4 Option in an IPv4 Header.

Figure 7:
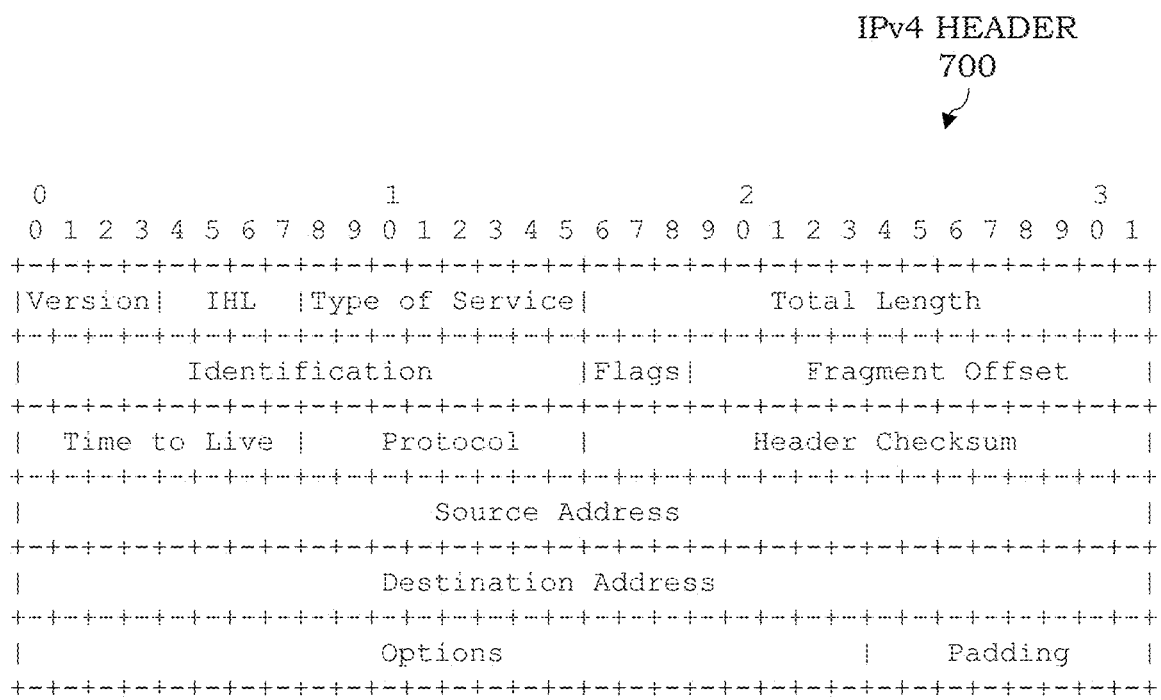
FIG. 7 depicts an example embodiment of an IPv4 Header configured for use to provide a Compressed Source Route for source route compression.

FIG. 7 depicts an example embodiment of an IPv4 Header including Options. The IPv4 Header 700 includes the usual fields of an IPv4 Header and Options. The Options provide for control functions needed or useful in some situations but unnecessary for the most common communications. For example, the Options include provisions for timestamps, security, and special routing. Each Option starts with a 1-octet type field followed by a type-specific encoding. Options are of variable length. Thus, the minimum size of an Option is 1-octet (Only type) if it does not have any type specific data. Maximum size of an Option is limited by maximum permissible value of IP Header Length (IHL) field in the IPV4 Header since the field includes the length of all Options included in the IPv4 Header. The 1-octet Type is viewed as having 3 fields: (1) a 1 bit copied flag field, (2) a 2 bit option class field, and (3) a 5 bit option number field. The copied flag indicates whether or not the Option is copied into all fragments on fragmentation (e.g., 0=not copied and 1=copied). The option classes are: (a) 0=control, (b) 1=reserved for future use, (c) 2=debugging and measurement, and (d) 3=reserved for future use. Various example embodiments may be configured to support implementation of CSR in IPv4 networks based on implementation of CSR as an IPv4 Option referred to as the CSR Option. An example format of a CSR Option is presented with respect to FIG. 8.

FIG. 8 depicts an example embodiment of a CSR Option for use in the IPv4 Header of FIG. 7 to provide a CSR for source route compression. The CSR Option 800 includes a Type field, a Length field, and a CSRB list field. The Type field is a 1-octet field that indicates the CSR Option in tuples of COPY, CLASS and NUMBER, which is 31. The Length field is a 1-octet field that indicates the length of this option that includes Type octet, Length octet, octets in the list of CSRBs. The CSRB list field includes a list of P CSRBs. An example format of a CSRB is presented with respect to FIG. 9.

Figure 9:
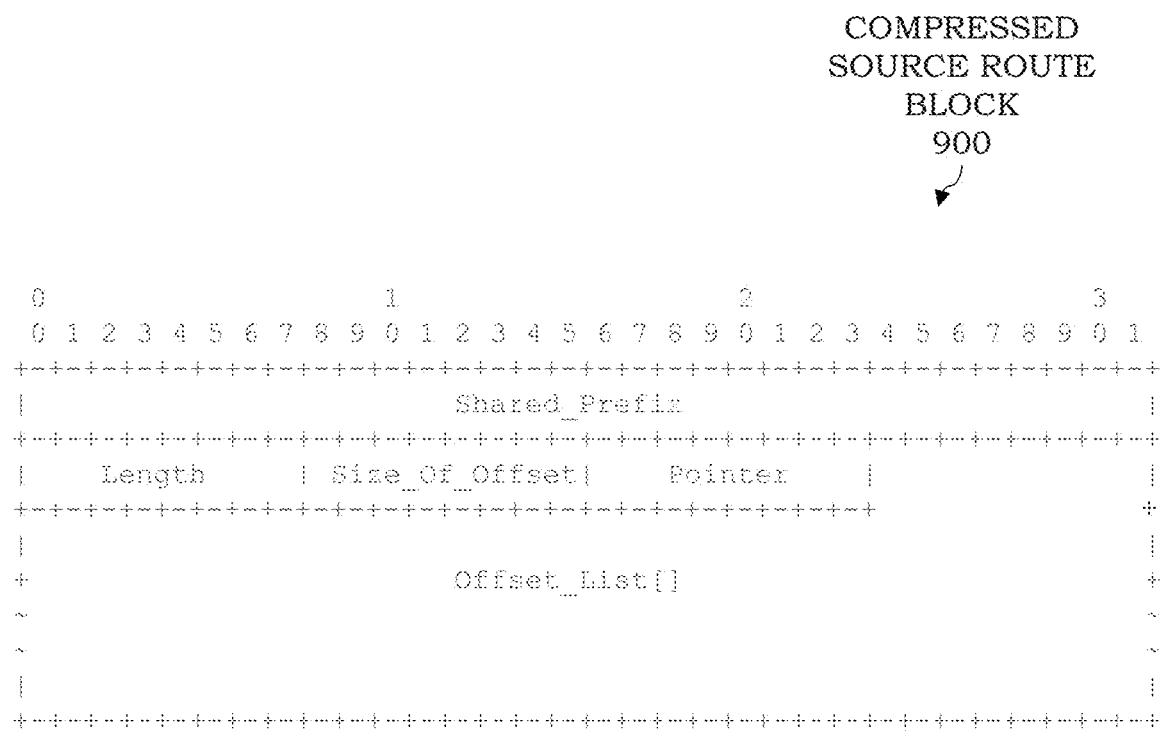
FIG. 9 depicts an example embodiment of a Compressed Source Route Block for use in the Compressed Source Route Option of FIG. 8 to provide a Compressed Source Route for source route compression.

FIG. 9 depicts an example embodiment of a CSRB for use in the CSR Option of FIG. 8 to provide a CSR for source route compression. The CSRB 900 includes a Shared_Prefix field, a Length field, a Size_of_Offset field, a Pointer field, and an Offset_List[n] field. The Shared_Prefix field is a 4-octet field that encodes the IPv4 Shared_Prefix. The Length field is a 1-octet field that indicates length of the CSRB that includes the Shared_Prefix octets, the Length octet, the Size_Of_Offset octets, the Pointer octet, and the octets in Offset_List[ ]. The Size_of_Offset is a 1-octet field that indicates the size of an entry in the Offset_List[ ] in units of bytes. The Pointer field is a 1-octet field that indicates the octet in Offset_List[ ] which begins the next offset to process. The pointer is relative to this Option, and the smallest legal value for the Pointer is 8, which points to the 8$^{th}$ octet, i.e., the area immediately after the Pointer field. The Offset_List[ ] field is composed of a series of offset entries where each entry is of Size_Of_Offset octets.

The IPv4 CSR Option, as indicated above, supports implementation of CSR in IPv4 networks. When a router routes an IPv4 packet, it checks to see if the CSR Option is present and, if the CSR Option is present, the router parses the offset value beginning at the octet indicated by the Pointer and increments the Pointer by Size_Of_Offset. If the Pointer exceeds the Length, then it means the CSRB is already traversed. Then, if there is a next CSRB in the CSR then the next CSRB is processed. The CSRBs are processed in this manner as the packet traverses the source route path.

It will be appreciated that various example embodiments configured to support implementation of CSR in IPv4 networks based on implementation of CSR as an IPv4 Option may be supported in various other ways.

Various example embodiments may be configured to support implementation of CSR in IPv4 networks based on implementation of CSR as an IP-Shim Protocol.

The Internet Header Length (IHL) field in an IPv4 Header has 4 bits, which represents the number of 32-bit words on the IPv4 header, including the variable number of IPv4 Options. As a 4-bit field the maximum value is 15 words (15×32 bits, or 480 bits=60 bytes). The minimum value of IHL is 5, which indicates a length of 5×32=160 bits=20 bytes, i.e. the fixed size of IPv4 header excluding the Options. This means that the maximum size of Options can be 60−20=40 bytes, which limits the size of CSR Option to 40 bytes.

In at least some example embodiments, implementation of CSR in IPv4 networks may be based on implementation of CSR as an IP-Shim Protocol. A generic IP-Shim Layer may be inserted between the IPv4 header and the upper-layer/transport protocol header (e.g., Transmission Control Protocol (TCP), User Datagram Protocol (UDP), Internet Control Message Protocol (ICMP), or the like). The placement of the IP-Shim layer in the protocol stack is shown in FIG. 10.

Figure 10:
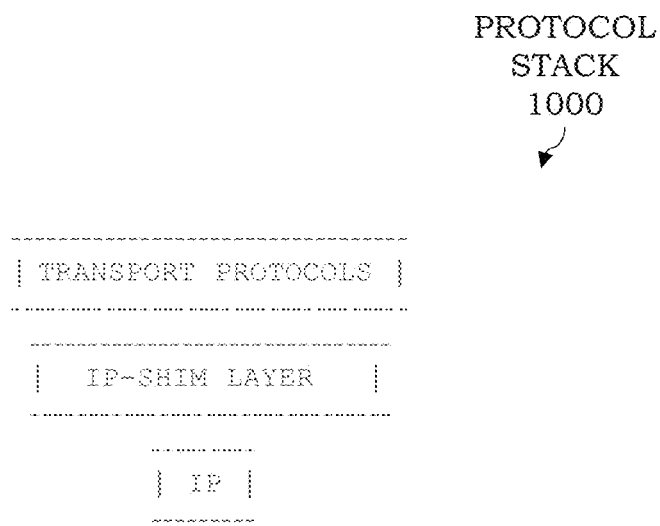
FIG. 10 depicts an example embodiment of a protocol stack for illustrating use of an IP-Shim Layer to provide a Compressed Source Route for source route compression.

FIG. 10 depicts an example embodiment of a protocol stack for illustrating use of an IP-Shim Layer to provide a Compressed Source Route for source route compression. The protocol stack 1000 illustrates the IP-Shim disposed between IP and Transport Protocols (e.g., TCP, UDP, ICMP, or the like). The IP-Shim Layer is carried using a new IP Protocol number in the IPv4 Header, which can be reserved from the registry maintained by the International Assigned Number Authority (IANA). For example, the IP-Protocol number for the IP-Shim layer may be 145 or any other suitable number. The IP-Shim Layer is defined as being generic such that it can carry any "enhancement" related to IP layer which, in order to support implementation of CSR in IPv4 networks, would include the CSR. The only router that inspects the IP-Shim Header is the router corresponding to the destination address of the packet or any router if a Router Alert Option is set in the IPV4 Header. An example format of an IP-Shim Header for use in the IP-Shim Layer is presented with respect to FIG. 11.

Figure 11:
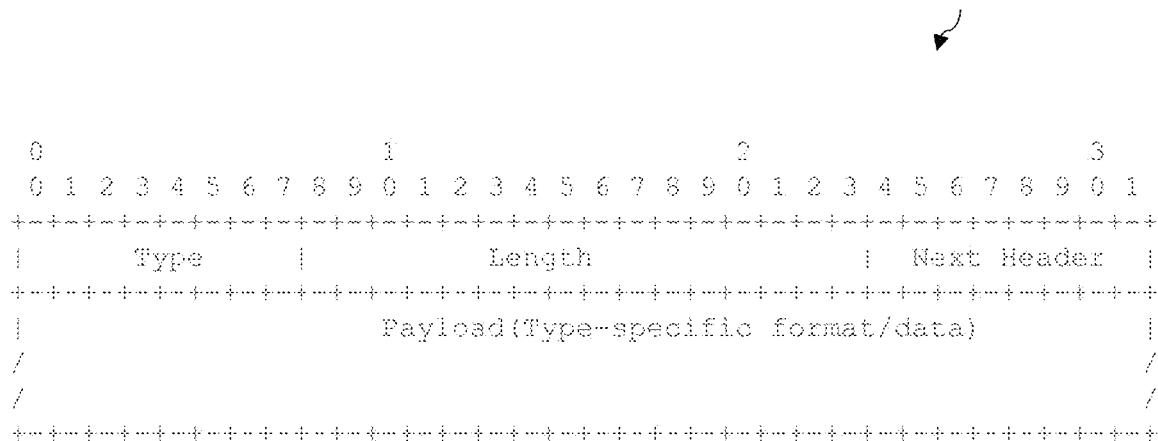
FIG. 11 depicts an example embodiment of an IP-Shim Header for use to provide a Compressed Source Route for source route compression.

FIG. 11 depicts an example embodiment of an IP-Shim Header for use to provide a Compressed Source Route for source route compression. The IP-Shim Header 1100 includes a Type field, a Length field, a Next Header field, and a Payload field. The IP-Shim Protocol is defined as generic and may carry different types within it. The Type field is an 8-bit field that carries the type. A new Type may be defined for an IPv4 CSR. For example, the new Type for the IPv4 CSR may be defined as follows: Type 16=IPv4-Compressed-Source-Route (IPv4-CSR). It is noted that, herein, "IPv4-CSR-Shim Header" means the IP-Shim Header Type 16. It will be appreciated that other values may be used for the Type for the IPv4-CSR. The Length field is a 16-bit field that carries the length of the payload in octets, where the octets of the Type, Length, and Next Header fields are excluded. The Next Header field provides the IP Protocol type of the header next to the IP-Shim Header (e.g., TCP, UDP, ICMP, or the like). The Payload field includes the type-specific format. The payload includes one or more CSRBs. An example format of a Payload of the IPv4-CSR-Shim Header is presented with respect to FIG. 12.

Figure 12:
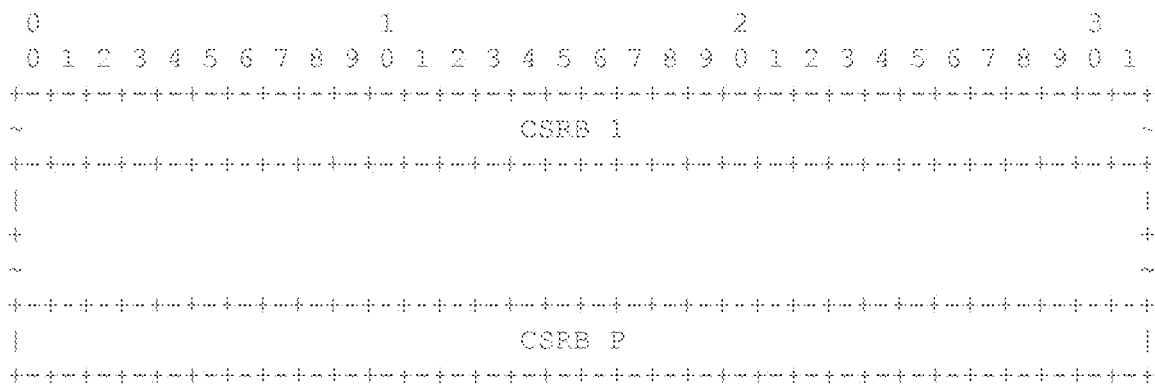
FIG. 12 depicts an example embodiment of an IPv4 Compressed Source Route for use as a payload in the IP-Shim Header to provide a Compressed Source Route for source route compression.

FIG. 12 depicts an example embodiment of an IPv4 Compressed Source Route for use as a payload in the IP-Shim Header to provide a Compressed Source Route for source route compression. The IPv4-CSR-Shim Payload 1200 includes P CSRBs.

The IPv4-CSR-Shim Header, as indicated above, supports implementation of CSR in IPv4 networks. The originator of IPv4-CSR-Shim Header, in addition to inserting the IPv4-CSR-Shim Header, also inserts a Router Alert Option so that every router inspects the IPv4-CSR-Shim Header. When a router routes an IPv4 packet that includes a Router Alert Option, then it checks to see if an IPv4-CSR-Shim Header is present. If an IPv4-CSR-Shim Header is present, the router evaluates each CSRB in the CSR sequentially to find the next CSRB to process. If the Pointer in a CSRB is greater than the Length, then CSRB is considered to be traversed. Then, if there is a next CSRB in the CSR then the next CSRB is processed. The router parses from the CSRB the offset value beginning at the octet indicated by the Pointer and increments the Pointer by Size_Of_Offset.

It will be appreciated that various example embodiments configured to support implementation of CSR in IPv4 networks based on implementation of CSR as an IP-Shim Protocol may be supported in various other ways.

It will be appreciated that various example embodiments configured to support implementation of CSR in IPv4 networks may be supported in various other ways.

Various example embodiments may be configured to support implementation of CSR in IPv6 networks. Various example embodiments may be configured to support implementation of CSR in IPv6 networks in various ways (e.g., based on implementation of CSR as an IPv6 Extension Header, based on implementation of CSR as an IP-Shim Protocol, or the like, as well as various combinations thereof).

Various example embodiments may be configured to support implementation of CSR in IPv6 networks based on implementation of CSR as an IPv6 Extension Header.

IPv6 supports several IPv6 Extension Headers (EHs) that can be appended to an IPv6 Header, and various example embodiments may be configured to support implementation of CSR in IPv6 networks based on implementation of CSR as an IPv6 EH in an IPv6 Header.

Figure 13:
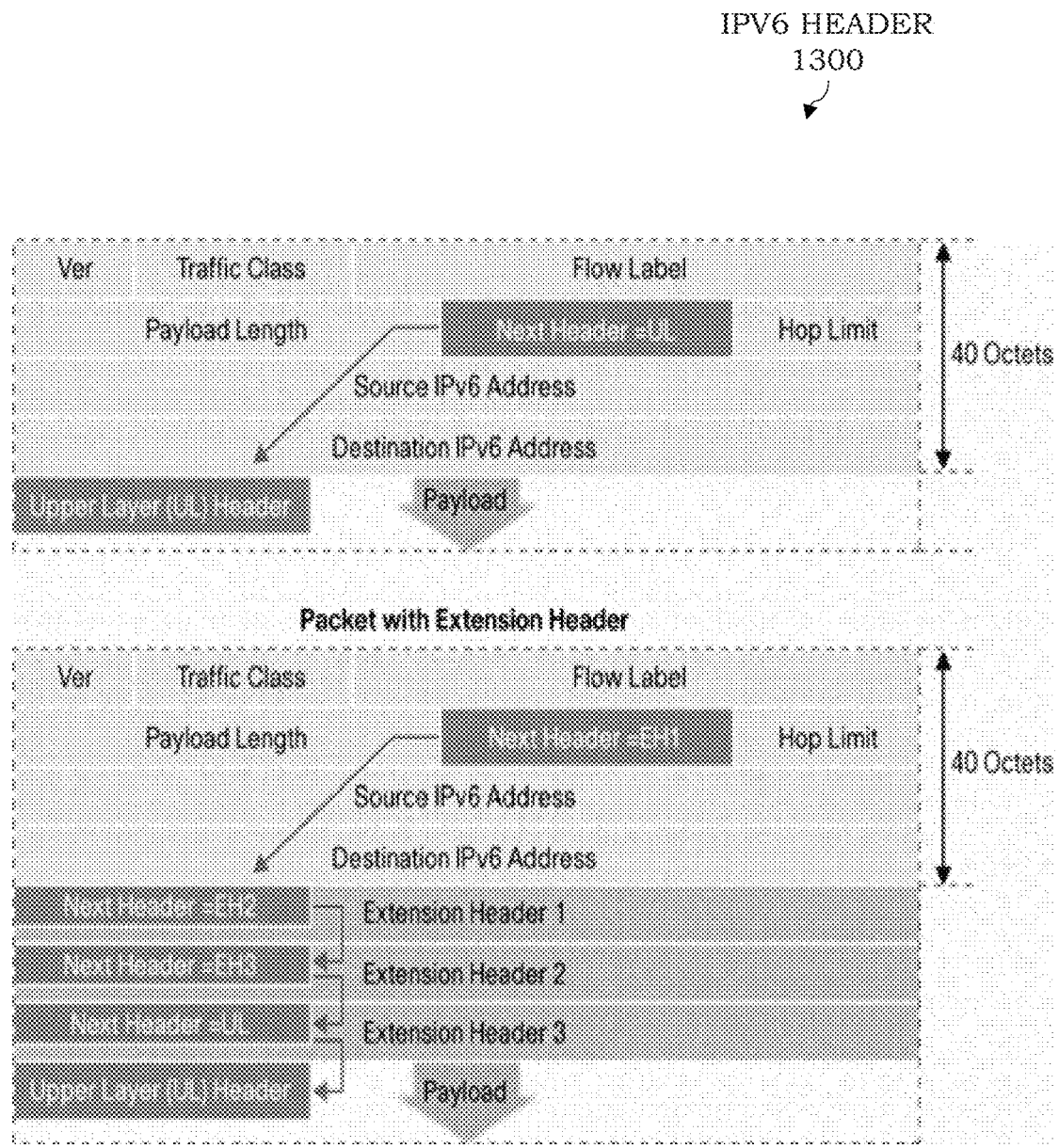
FIG. 13 depicts an example embodiment of an IPv6 Header configured for use to provide a Compressed Source Route for source route compression.

FIG. 13 depicts an example embodiment of an IPv6 Header configured for use to provide a CSR for source route compression. In the IPv6 Header 1300, the main IPv6 header remains fixed in size (40 bytes) while customized EHs are added as needed. The EHs provide for control functions needed or useful in some situations but unnecessary for the most common communications. For example, the EHs include provisions for timestamps, security, and special routing. Each EH starts with a 1-octet Next Header field, followed by its own body. The format of the body is dependent on the type of EH. The Next Header field of an EH points to the type of the next EH. So, multiple EHs are chained together by their Next Header fields. The Next Header field on the last EH in the chain indicates the type of the IPv6 payload. Section 4.3 in the IPv6 specification describes an EH referred to as a "Hop-by-Hop Options Header" that can be used to carry optional information that must be examined by each router along the delivery path of the packet. It is identified by the value of 0 in the Next Header field of the IPv6 Header or of an EH. This EH is generic and multiple options can be defined within the EH. So, any special directive to be examined by each transit router of an IPv6 packet is defined as an option within the Hop-by-Hop Options Header. An example format of a Hop-by-Hop Options Header is presented with respect to FIG. 14.

FIG. 14 depicts an example embodiment of a Hop-By-Hop Options Header for use in the IPv6 Header of FIG. 13 to provide a CSR for source route compression. The Hop-by-Hop Options Header 1400 includes a Next Header field, a Header Extension Length field, and an Options field. The Next Header is an 8-bit selector that identifies the type of header immediately following the Hop-by-Hop Options header. The Header Extension Length field is an 8-bit unsigned integer that indicates the length of the Hop-by-Hop Options header in 8-octet units, not including the first 8 octets. The Options field is a variable-length field of length such that the complete Hop-by-Hop Options header is an integer multiple of 8 octets long. The Options field includes one or more TLV-encoded options. An example format of a TLV encoded option configured for use in the Hop-By-Hop Options Header of FIG. 14, to provide a CSR for source route compression, is presented with respect to FIG. 15.

FIG. 15 depicts an example embodiment of a TLV-encoded option configured for use in the Hop-By-Hop Options Header to provide a CSR for source route compression. The TLV-encoded option 1500 includes an Option Type field, an Option Data Length field, and an Option Data field. The Option Type field is an 8-bit identifier of the type of option. The Option Data Length field is an 8-bit unsigned integer that indicates the length of the Option Data field of this option, in octets. The Option Data field is a variable-length field that includes Option-Type-specific data.

The Hop-by-Hop Options Header, as indicated above, supports implementation of CSR in IPv6 networks. The sequence of Options within an IPv6 Header will be processed strictly in the order that the Options appear in the header. A receiver will not, for example, scan through the header looking for a particular kind of option and process that option prior to processing all preceding ones.

The Option Type identifiers are internally encoded such that the highest-order two bits specify the action to be taken if the processing IPv6 node does not recognize the Option Type: (a) 00—skip over this option and continue processing the header, (b) 01—discard the packet, (c) 10—discard the packet and, regardless of whether or not the Destination Address of the packet was a multicast address, send an ICMP Parameter Problem, Code 2, message to the Source Address of the packet, pointing to the unrecognized Option Type, and (d) 11—discard the packet and, only if the Destination Address of the packet was not a multicast address, send an ICMP Parameter Problem, Code 2, message to the Source Address of the packet, pointing to the unrecognized Option Type.

The Option Type identifiers are internally encoded such that the third-highest-order bit of the Option Type specifies whether or not the Option Data of that option can change en-route to the final destination of the packet: (a) 0—Option Data does not change en-route and (b) 1—Option Data may change en-route. When an Authentication Header (another type of EH that carries an authentication digest of the packet) is present in the packet, for any option whose data may change en-route, its entire Option Data field will be treated as zero-valued octets when computing or verifying the authenticating digest of the packet.

The three high-order bits described above are to be treated as part of the Option Type, not independent of the Option Type. That is, a particular option is identified by a full 8-bit Option Type, not just the low-order 5 bits of an Option Type.

The Option Type for the Hop-by-Hop Options Header for source route compression is referred to as a CSR Option. An example format of a CSR Option is presented with respect to FIG. 16.

FIG. 16 depicts an example embodiment of a CSR Option for use in a Hop-By-Hop Options Header to provide a CSR for source route compression. The CSR Option 1600 includes an Option Type field, an Option Data Length field, a Reserved field, and a CSRB list field.

The Option Type field encodes the option type that indicates it as CSR option. The highest-order 2-bits are encoded with the value 10, which indicates to discard the packet and, regardless of whether or not the Destination Address of the packet was a multicast address, send an ICMP Parameter Problem, Code 2, message to the Source Address of the packet, pointing to the unrecognized Option Type. The $3^{rd}$ highest order bit is encoded with the value 1, which indicates that the Option Data may change en-route, because the content of CSR changes at each hop/router. The remaining 5-bits are assigned the value 10010, which results in the value of Option Type field as 0x32. The Option Data Length field is variable and the value of this field indicates the length of remaining bytes in the CSR option. The CSRB list field includes a list of P CSRBs. An example format of a CSRB is presented with respect to FIG. 17.

Figure 17:
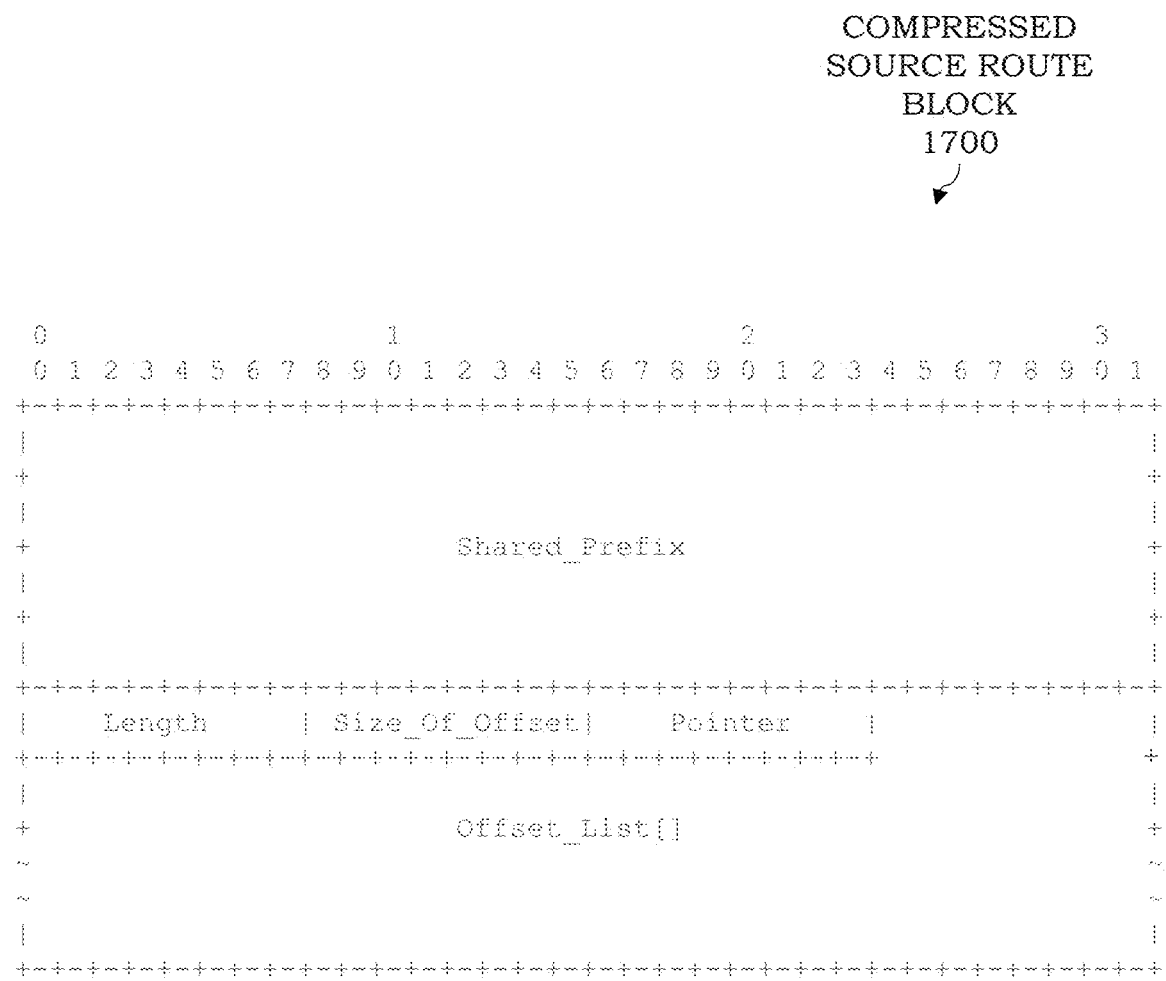
FIG. 17 depicts an example embodiment of a Compressed Source Route Block configured for use in the Compressed Source Route Option of FIG. 16 to provide a Compressed Source Route for source route compression.

FIG. 17 depicts an example embodiment of a CSRB configured for use in the CSR Option of FIG. 16 to provide a CSR for source route compression. The CSRB 1700 includes a Shared_Prefix field, a Length field, a Size_of_Offset field, a Pointer field, and an Offset_List[ ] field. The Shared_Prefix field is a 16-octet field that encodes the IPv6 Shared_Prefix. The Length field is a 1-octet field that indicates length of the CSRB that includes the Shared_Prefix octets, the Length octet, the Size_Of_Offset octets, the Pointer octet, and the octets in Offset_List[ ]. The Size_of_Offset is a 1-octet field that indicates the size of an entry in the Offset_List[ ] in units of bytes. The Pointer field is a 1-octet field that indicates the octet in Offset_List[ ] which begins the next offset to process. The pointer is relative to this Option, and the smallest legal value for the Pointer is 20, which points to the $20^{th}$ octet, i.e., the area immediately after the Pointer field. The Offset_List[ ] field is composed of a series of offset entries where each entry is of Size_Of_Offset octets.

The IPv6 CSR Option, as indicated above, supports implementation of CSR in IPv6 networks. When a router routes an IPv6 packet that includes a Hop-by-Hop Options Header, the router checks to see if the CSR Option is present within the Header. If the Pointer in a CSRB is greater than the Length, then CSRB is considered to be traversed. Then, if there is a next CSRB in the CSR then the next CSRB is processed. The router parses from the CSRB the offset value beginning at the octet indicated by the Pointer and increments the Pointer by Size_Of_Offset.

It will be appreciated that various example embodiments configured to support implementation of CSR in IPv6 networks based on implementation of CSR as an IPv6 Extension Header may be supported in various other ways.

Various example embodiments may be configured to support implementation of CSR in IPv6 networks based on implementation of CSR as an IP-Shim Protocol.

In at least some example embodiments, implementation of CSR in IPv6 networks may be based on implementation of CSR as an IP-Shim Protocol. A generic IP-Shim Layer may be inserted between the IPv6 header and the upper-layer/transport protocol header (e.g., TCP, UDP, ICMP, or the like). The protocol stack may be similar to the protocol stack presented in FIG. 10 for IPv4.

The IP-Shim Layer is carried using a new IP Protocol number in the IPv6 Header, which can be reserved from the registry maintained by the IANA. For example, the IP-Protocol number for the IP-Shim layer may be 145 or any other suitable number. The IP-Shim Layer is defined as being generic such that it can carry any "enhancement" related to IP layer which, in order to support implementation of CSR in IPv6 networks, would include the CSR. The only router that inspects the IP-Shim Header is the router corresponding to the destination address of the packet or any router if a Router Alert Option is set in the IPv6 Header. The IP-Shim Header may be similar to the IP-Shim Header presented in FIG. 11.

The IP-Shim Header includes a Type field, a Length field, a Next Header field, and a Payload field. The IP-Shim Protocol is defined as generic and may carry different types within it. The Type field is an 8-bit field that carries the type. A new Type may be defined for an IPv6 CSR. For example, the new Type for the IPv4 CSR may be defined as follows: Type 17=IPv6-Compressed-Source-Route (IPv6-CSR). It is noted that, herein, "IPv6-CSR-Shim Header" means the IP-Shim Header Type 17. It will be appreciated that other values may be used for the Type for the IPv6-CSR. The Length field is a 16-bit field that carries the length of the payload in octets, where the octets of the Type, Length, and Next Header fields are excluded. The Next Header field provides the IP Protocol type of the header next to the IP-Shim Header (e.g., TCP, UDP, ICMP, or the like). The Payload field includes the type-specific format. The payload includes P CSRBs. The Payload of the IPv6-CSR-Shim Header may be similar to the Payload presented in FIG. 12 for IPv4 with each of the CSRBs being similar to the CSRB format presented in FIG. 17.

The IPv6-CSR-Shim Header, as indicated above, supports implementation of CSR in IPv6 networks. The originator of IPv6-CSR-Shim Header, in addition to inserting the IPv6-CSR-Shim Header, also inserts a Router Alert Option so that every router inspects the IPv6-CSR-Shim Header. When a router routes an IPv6 packet that includes a Router Alert Option, then it checks to see if an IPv6-CSR-Shim Header is present. If an IPv6-CSR-Shim Header is present, the router evaluates each CSRB in the CSR sequentially to find the next CSRB to process. If the Pointer in a CSRB is greater than the Length, then CSRB is considered to be traversed. Then, if there is a next CSRB in the CSR then the next CSRB is processed. The router parses from the CSRB the offset value beginning at the octet indicated by the Pointer and increments the Pointer by Size_Of_Offset.

It will be appreciated that various example embodiments configured to support implementation of CSR in IPv6 networks based on implementation of CSR as an IP-Shim Protocol may be supported in various other ways.

It will be appreciated that various example embodiments configured to support implementation of CSR in IPv6 networks may be supported in various other ways.

Various example embodiments may be configured to support implementation of CSR in MPLS networks.

In an MPLS-based source routed network (e.g., segment routing using the MPLS data plane), each CSRB is an independent label stack. So, a CSR is composed of one or more consecutive label stacks of one or more CSRBs. An example format of a CSRB is presented with respect to FIG. 18.

FIG. 18 depicts an example embodiment of a CSRB for use to provide a CSR for source route compression in an MPLS-based network. The CSRB 1800 includes a CSRB-Indicator (CSRB-I), a Base Label, a CSRB Descriptor, and an Offset Label Stack.

The CSRB-I is configured to enable receiving routers to distinguish between CSRB labels and non-CSRB labels. The CSRB-I is inserted into the label stack such that it immediately precedes (where "precedes" means closer to the top of the label stack and farther from the bottom of stack indication) the other labels of the CSRB (i.e., it may or may not be considered to form part of the CSRB). It will be appreciated that, if source route compression is standardized in IETF then a value of CSRB-I may be reserved at the IANA registry on special-purpose labels. It is noted that the EXP and TTL fields in CSRB-I will be set to 0 and a receiving router will ignore these fields. The sending router and receiving router of CSRB-I will use the EXP field of the label underneath the CSRB-I for mapping to the appropriate forwarding class. The S-bit in CSRB-I will be set to 0 since the other labels of the CSRB follow.

The Base Label, which follows the CSRB-I, is the Base Label (Shared_Prefix) for the offsets included in the CSRB. The EXP and TTL fields will be set to the desired value. The S-bit will be set to 0 since other labels of the CSRB follow.

The CSR Descriptor, which follows the Base Label, is a special label that describes the Size_Of_Offset (SOO) and the number of subsequent Offsets in the CSRB. So, this label does not carry a special fixed value. An example format of a CSRB Descriptor is presented with respect to FIG. 19. FIG. 19 depicts an example embodiment of a CSRB Descriptor configured for use in the CSRB of FIG. 18 to provide a CSR for source route compression in an MPLS-based network. The CSRB Descriptor 1900 includes a Size_of_Offset (SOO) field, a Number of Offsets (Num Offsets) field, an EXP field, an S-bit, and a TTL field. The SOO field is a 3-bit field that encodes the Size_of_Offset. The SOO field may encode values of: (a) 1, which means that the size of an offset is 1 B, so the area associated with the CSRB can address up to 256 network elements or (b) 2, which means that the size of an offset is 2 B, so the area associated with the CSRB can address up to 65,535 network elements. The Number of Offsets field is a 17-bit field, the value of which indicates the number of subsequent offsets that belong to the CSRB. If the value is 'N' then subsequent N offsets (following the CSRB descriptor), each of size SOO, belong to the CSRB. The EXP field is set to 0 by the originator of the CSRB and ignored by the receiver of the CSRB. The S-bit field is set to 0, as the labels describing the offsets follow. The TTL is set to 0 and the receiver will ignore the value of this field.

The Offset Label Stack (OLS) is the body of the CSRB that includes the Offset_List[ ]. The exact structure depends on the value in SOO field in the CSRB descriptor. An example format of the OLS when the SOO value is 1 (i.e., 1 B Offsets are used) is presented with respect to FIG. 20. FIG. 20 depicts an example embodiment of an OLS configured for use in the CSRB of FIG. 18 to provide a CSR for source route compression in an MPLS-based network. The OLS 2000 includes N Offset Labels. Here, the OLS 2000 may be supported by extending each MPLS label to 32-bits (e.g., by overwriting the EXP, S-bit, and TTL fields, as these latter three fields are not necessary) and then segmenting each of the MPLS labels into four 1 B fields. In this manner, each of the extended 32-bit MPLS labels may be used to encode four of the 1 B Offset Labels. In the OLS 2000, each 1 B Offset Label field encodes an offset value for the corresponding hop (network element) in the CSRB. The label for the hop is obtained by adding the offset value to Base Label.

Figure 21:
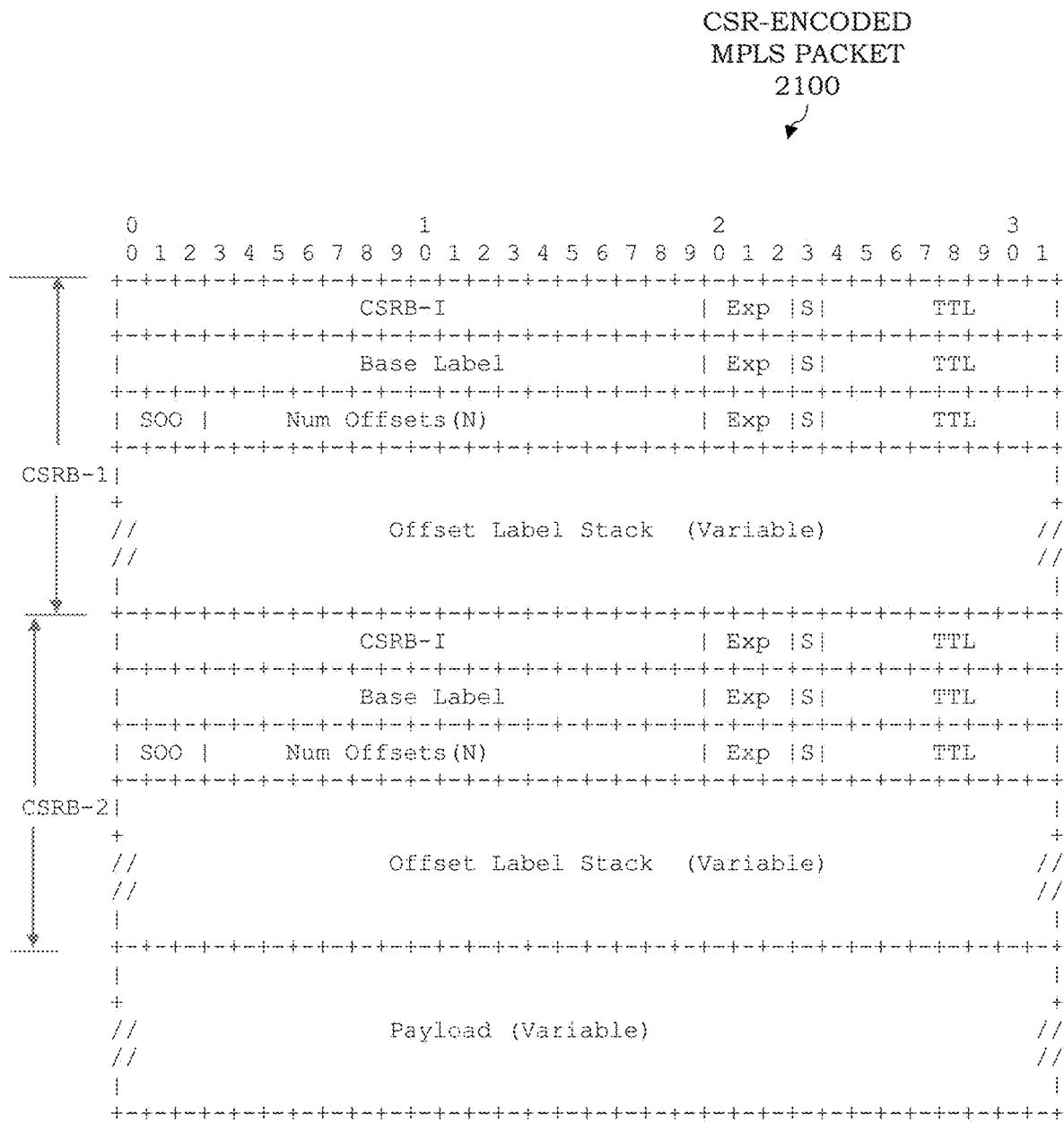
FIG. 21 depicts an example embodiment of a Compressed Source Route (CSR) encoded MPLS packet configured to provide a Compressed Source Route for source route compression in an MPLS-based network.

FIG. 21 depicts an example embodiment of a CSR-encoded MPLS packet configured to provide a CSR for source route compression in an MPLS-based network. In the CSR-encoded MPLS packet 2100, since the source route traverses two areas, the CSR includes two CSRB label stacks for the two areas, respectively.

It will be appreciated that various example embodiments configured to support implementation of CSR in MPLS networks may be supported in various other ways.

Figure 22:
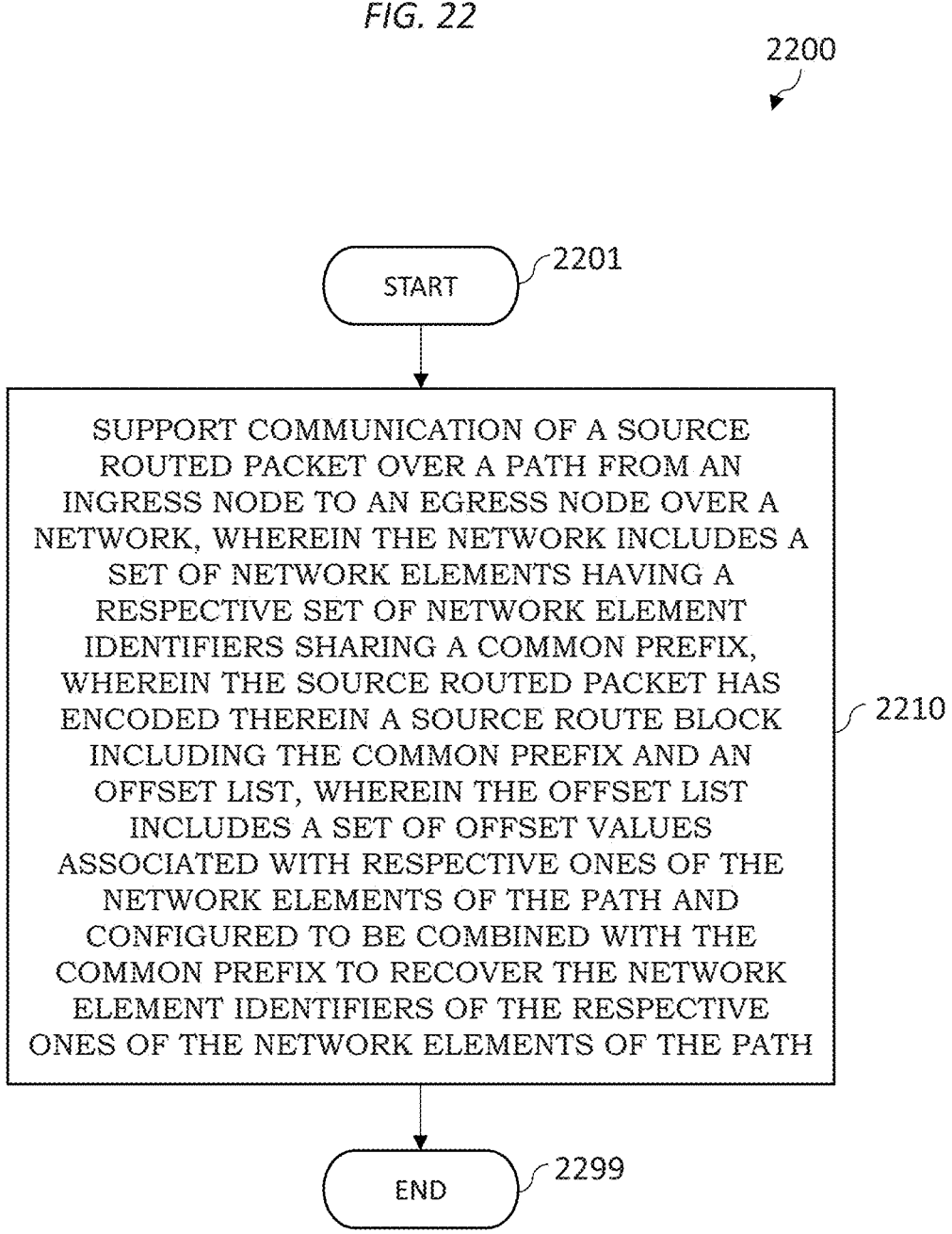
FIG. 22 depicts an example embodiment of a method for supporting source routing based on source route compression.

FIG. 22 depicts an example embodiment of a method for supporting source routing based on source route compression. It will be appreciated that, although primarily presented herein as being performed serially, at least a portion of the functions of method 2200 may be performed contemporaneously or in a different order than as presented in FIG. 22. At block 2201, the method 2200 begins. At block 2210, support communication of a source routed packet over a path from an ingress node to an egress node over a network, wherein the network includes a set of network elements having a respective set of network element identifiers sharing a common prefix, wherein the source routed packet has encoded therein a source route block including the common prefix and an offset list, wherein the offset list includes a set of offset values associated with respective ones of the network elements of the path and configured to be combined with the common prefix to recover the network element identifiers of the respective ones of the network elements of the path. At block 2299, the method 2200 ends.

Various example embodiments for supporting source routing based on source route compression may provide various advantages or potential advantages. For example, various example embodiments for supporting source routing based on source route compression may be generic and, thus, may be configured to support source route compression for various packet switching technologies, such as IPv4, IPv6, MPLS, Ethernet, or the like. For example, various example embodiments for supporting source routing based on source route compression may be generic and, thus, may be configured to support source route compression for various packet switching technologies, such as IPv4, IPv6, MPLS, Ethernet, or the like, with minor changes in the data plane. For example, various example embodiments for supporting source routing based on source route compression may be configured to support significant header compression in Segment Routing (SR) for various packet switching technologies, such as IPv4 (e.g., SR with IPv4 may support header compression of approximately 45.3%—70.83%), IPv6 (e.g., SR with IPv6 may support header compression of approximately 84%-90.2%, SR with MPLS may support header compression of approximately 45.3%-70.83%, SR with Ethernet may support header compression of approximately 79.44%, and so forth). For example, various example embodiments for supporting source routing based on source route compression may be configured to support significant header compression in SR for IPv6 which, in the absence of source route compression as presented herein, may experience significant overhead (e.g., for a 1500 B packet the SR IPv6 would impose a 32% overhead penalty which translates to an immediate loss of 3.2 gigabits per second out of a 10 Gigabit per second link and for a 512 B packet the SR IPv6 would impose a 93.2% overhead penalty which translates to an immediately loss of 9.32 gigabits per second on a 10 Gigabit per second link). Various example embodiments for supporting source routing based on source route compression may provide various other advantages or potential advantages.

Figure 23:
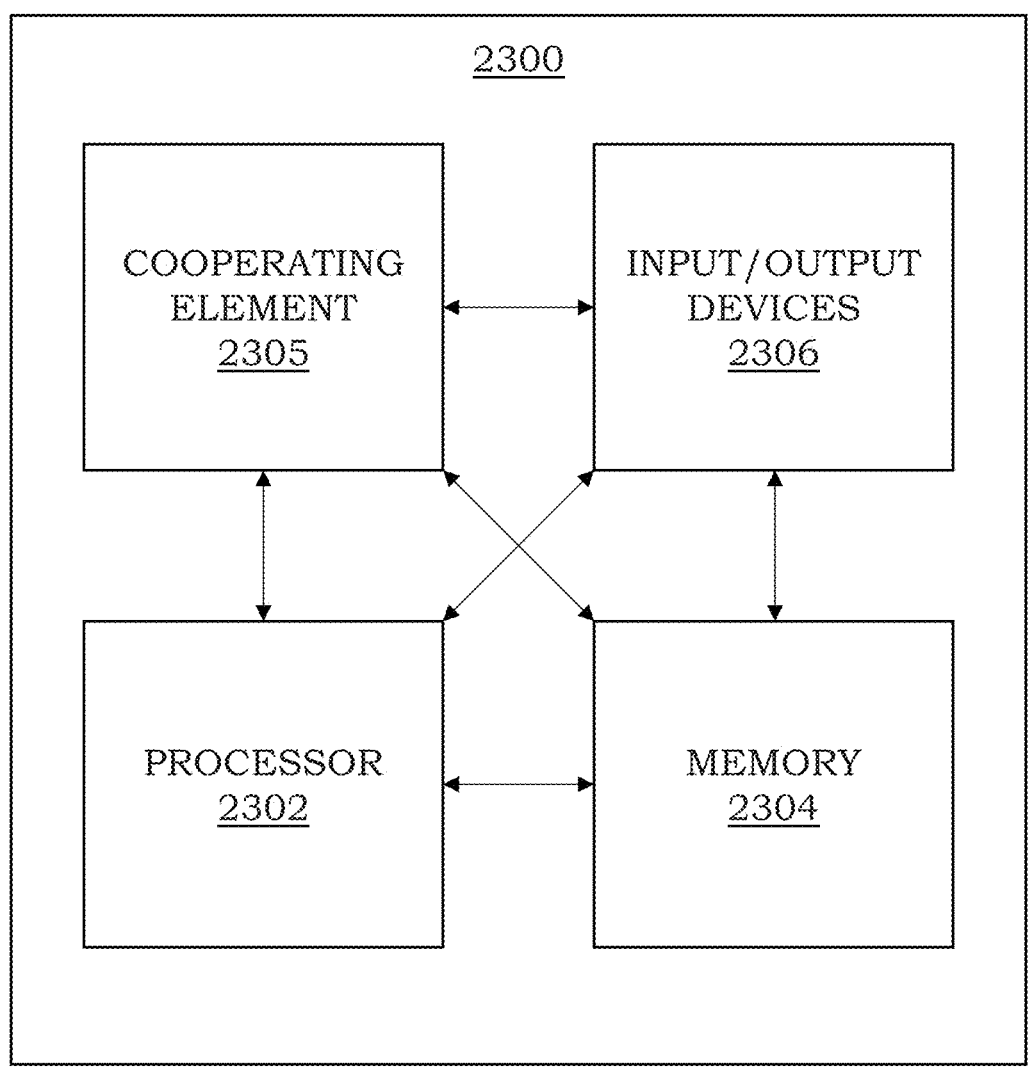
FIG. 23 depicts an example embodiment of a computer suitable for use in performing various functions presented herein.

FIG. 23 depicts an example embodiment of a computer suitable for use in performing various functions presented herein.

The computer 2300 includes a processor 2302 (e.g., a central processing unit (CPU), a processor, a processor having a set of processor cores, a processor core of a processor, or the like) and a memory 2304 (e.g., a random access memory, a read only memory, or the like). The processor 2302 and the memory 2304 may be communicatively connected. In at least some example embodiments, the computer 2300 may include at least one processor and at least one memory including computer program code, wherein the at least one memory and the computer program code are configured to, with the at least one processor, cause the computer to perform various functions presented herein.

The computer 2300 also may include a cooperating element 2305. The cooperating element 2305 may be a hardware device. The cooperating element 2305 may be a process that can be loaded into the memory 2304 and executed by the processor 2302 to implement various functions presented herein (in which case, for example, the cooperating element 2305 (including associated data structures) can be stored on a non-transitory computer-readable storage medium, such as a storage device or other suitable type of storage element (e.g., a magnetic drive, an optical drive, or the like)).

The computer 2300 also may include one or more input/output devices 2306. The input/output devices 2306 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 2300 may represent a general architecture and functionality suitable for implementing functional elements described herein, portions of functional elements described herein, or the like, as well as various combinations thereof. For example, computer 2300 may provide a general architecture and functionality that is suitable for implementing one or more elements presented herein, such as a node or a portion thereof, a router or a portion thereof, a source routing element or a portion thereof, a controller or a portion thereof, or the like, as well as various combinations thereof.

It will be appreciated that at least some of the functions presented herein may be implemented within hardware, for example, as circuitry that cooperates with the processor to perform various functions. It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents). It will be appreciated that at least some of the functions presented herein may be implemented by an apparatus including at least one processor and at least one memory including computer program code, wherein the at least one memory and the computer program code are configured to, with the at least one processor, cause the apparatus to perform various functions presented herein. It will be appreciated that portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including instructions that, when executed by the at least one processor, cause the apparatus at least to:
   determine, for a path including a set of network elements having a respective set of network element identifiers associated therewith, a plurality of subsets of network elements of the path;
   determine, for each of the plurality of subsets of network elements, a respective common prefix shared by the respective network element identifiers of respective ones of the network elements in the respective subset of network elements;
   determine, for each of the plurality of subsets of network elements, a respective set of offset values associated with the respective ones of the network elements in the respective subset of network elements and configured to be combined with the respective common prefix for the respective subset of network elements to recover the respective network element identifiers of the respective ones of the network elements in the respective subset of network elements;
   generate a set of source route blocks including, for each of the plurality of subsets of network elements, a respective source route block including the respective common prefix for the respective subset of network elements, a respective offset size value indicative of a size of each of the offset values in the respective set of offset values for the respective subset of network elements, and the respective set of offset values for the respective subset of network elements; and
   send, toward a next hop of the path, a source routed packet including a header and a payload, wherein the header includes the set of source route blocks.

2. The apparatus of claim 1, wherein the set of network elements includes each of the network elements of the network.

3. The apparatus of claim 1, wherein the set of network elements includes at least one of a set of nodes or a set of links.

4. The apparatus of claim 1, wherein, for at least one of the source route blocks, the respective common prefix for the respective subset of network elements includes an Internet Protocol (IP) prefix, a Multiprotocol Label Switching (MPLS) label value, or an Ethernet Media Access Control (MAC) Address prefix.

5. The apparatus of claim 1, wherein at least one of the source route blocks is encoded using an Internet Protocol version 4 (IPv4) Options Header.

6. The apparatus of claim 1, wherein at least one of the source route blocks is encoded using an Internet Protocol version 4 (IPv4) Shim header disposed between an IPV4 Header and a transport layer protocol header.

7. The apparatus of claim 1, wherein at least one of the source route blocks is encoded using an Internet Protocol version 6 (IPv6) Extension Header (EH).

8. The apparatus of claim 1, wherein at least one of the source route blocks is encoded using an Internet Protocol version 6 (IPv6) Shim header disposed between an IPv6 Header and a transport layer protocol header.

9. The apparatus of claim 1, wherein at least one of the source route blocks is encoded using a Multiprotocol Label Switching (MPLS) label stack.

10. A method, comprising:
    determining, for a path including a set of network elements having a respective set of network element identifiers associated therewith, a plurality of subsets of network elements of the path;
    determining, for each of the plurality of subsets of network elements, a respective common prefix shared by the respective network element identifiers of respective ones of the network elements in the respective subset of network elements;
    determining, for each of the plurality of subsets of network elements, a respective set of offset values associated with the respective ones of the network elements in the respective subset of network elements and configured to be combined with the respective common prefix for the respective subset of network elements to recover the respective network element identifiers of the respective ones of the network elements in the respective subset of network elements;
    generating a set of source route blocks including, for each of the plurality of subsets of network elements, a respective source route block including the respective common prefix for the respective subset of network elements, a respective offset size value indicative of a size of each of the offset values in the respective set of offset values for the respective subset of network elements, and the respective set of offset values for the respective subset of network elements; and
    sending, toward a next hop of the path, a source routed packet including a header and a payload, wherein the header includes the set of source route blocks.

11. An apparatus, comprising:
    at least one processor; and
    at least one memory including instructions that, when executed by the at least one processor, cause the apparatus at least to:
    support communication of a source routed packet over a path including a set of network elements, wherein the network elements have associated therewith respective network element identifiers sharing a common prefix;
    wherein the source routed packet includes a source route block including the common prefix and including a set of offset values associated with the respective network elements and configured to be combined with the common prefix to recover the respective network element identifiers of the respective network elements;

wherein the source route block includes a source route block indicator label configured to identify the source route block within the source routed packet;

wherein the source route block includes a base label including the common prefix;

wherein the source route block includes a source route block descriptor label including an offset size value indicative of a size of each of the offset values in set of offset values and including a number of offset values in the set of offset values; and wherein the source route block includes an offset label stack including one or more offset labels including the set of offset values.

* * * * *